(12) United States Patent
Vukosav et al.

(10) Patent No.: US 12,110,094 B2
(45) Date of Patent: *Oct. 8, 2024

(54) KEEL BEAM ASSEMBLY FOR AN AIRCRAFT

(71) Applicant: The Boeing Company, Chicago, IL (US)

(72) Inventors: Danilo Vukosav, Kirkland, WA (US); Daniel Cox, Seattle, WA (US); Evgeny M. Potupchik, Mukilteo, WA (US); James David Tummons, Kirkland, WA (US); Ryan Matthew Slater, Lynnwood, WA (US); Timothy R. Portway, Everett, WA (US)

(73) Assignee: The Boeing Company, Arlington, VA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/579,241

(22) Filed: Jan. 19, 2022

(65) Prior Publication Data

US 2022/0227474 A1 Jul. 21, 2022

Related U.S. Application Data

(60) Provisional application No. 63/139,722, filed on Jan. 20, 2021.

(51) Int. Cl.
*B64C 1/10* (2006.01)
*B64C 1/06* (2006.01)
*B64C 1/26* (2006.01)
*B64C 25/04* (2006.01)
*B64C 25/12* (2006.01)

(52) U.S. Cl.
CPC ............... *B64C 1/26* (2013.01); *B64C 1/064* (2013.01); *B64C 1/069* (2013.01); *B64C 1/10* (2013.01); *B64C 25/04* (2013.01); *B64C 2025/125* (2013.01)

(58) Field of Classification Search
CPC .. B64C 1/26; B64C 1/065; B64C 1/10; B64C 1/061; B64C 1/064; B64C 25/04
See application file for complete search history.

(56) References Cited

U.S. PATENT DOCUMENTS

| 9,199,719 | B2 * | 12/2015 | Durand | .................. B64C 3/185 |
| 11,787,523 | B2 * | 10/2023 | Vukosav | ................. B64C 1/064 |
| | | | | 244/120 |
| 2008/0156935 | A1 * | 7/2008 | Alby | ...................... B64C 1/065 |
| | | | | 244/119 |
| 2016/0185451 | A1 * | 6/2016 | Bellet | ....................... B64C 1/10 |
| | | | | 244/129.1 |

\* cited by examiner

*Primary Examiner* — Joshua J Michener
*Assistant Examiner* — Ryan Andrew Yankey
(74) *Attorney, Agent, or Firm* — Kolisch Hartwell, P.C.

(57) ABSTRACT

The present disclosure provides a keel beam assembly, an aircraft including the keel beam assembly, and a method of aircraft manufacture using the keel beam assembly. An illustrative keel beam assembly comprises a pair of keel chords extending outside an aircraft fuselage and forming at least part of a lower keel box portion of a keel box. An upper keel box portion of the keel box is coupled to the pair of keel chords and has an aft end engaged with and secured to an aft wheel well bulkhead (AWWB).

20 Claims, 12 Drawing Sheets

KEEL BEAM ASSEMBLY FOR AN AIRCRAFT

CROSS-REFERENCES

This application claims the benefit under 35 U.S.C. § 119(e) of the priority of U.S. Provisional Patent Application Ser. No. 63/139,722, filed Jan. 20, 2021, the entirety of which is hereby incorporated by reference for all purposes.

BACKGROUND

Commercial aircraft for cargo and passenger transport utilize a keel beam extending along the bottom of the fuselage. The keel beam braces the fuselage centrally along its length and helps to couple sections of the fuselage to one another. Commercial aircraft, such as a midsize commercial aircraft, may have a keel beam including a box beam portion (a keel box) located in an aft region of the keel beam where loads can be higher. However, integrating this type of keel beam into the aircraft can slow the rate of aircraft production significantly. Moreover, this integration presents substantial design challenges to ensure that the keel box is robust but relatively lightweight, while still creating an efficient load path without excessive bending moments under high load. A novel keel box to enable more efficient manufacture of aircraft would be desirable.

SUMMARY

The present disclosure provides a keel beam assembly, an aircraft including the keel beam assembly, and a method of aircraft manufacture using the keel beam assembly. An illustrative keel beam assembly comprises a pair of keel chords extending outside an aircraft fuselage and forming at least part of a lower keel box portion of a keel box. An upper keel box portion of the keel box is coupled to the pair of keel chords and has an aft end engaged with and secured to an aft wheel well bulkhead (AWWB).

In some examples, an aircraft comprises a fuselage, an aft wheel well bulkhead (AWWB), and a keel beam assembly. The keel beam assembly includes a pair of keel chords extending outside the fuselage and forming at least part of a lower keel box portion of a keel box. The keel beam assembly also includes an upper keel box portion of the keel box coupled to the pair of keel chords and having an aft end mounted onto a forward side of the AWWB.

In some examples, a method of aircraft manufacture uses an aircraft section including a fuselage portion coupled to a pair of keel chords. The keel chords extend outside the fuselage portion, form at least part of a lower keel box portion of a keel box, and are coupled to an upper keel box portion of the keel box. In the method, an aft end of the upper keel box portion is mounted onto a forward side of an aft wheel well bulkhead (AWWB).

Features, functions, and advantages may be achieved independently in various examples of the present disclosure, or may be combined in yet other examples, further details of which can be seen with reference to the following description and drawings.

DETAILED DESCRIPTION

Figure 1:
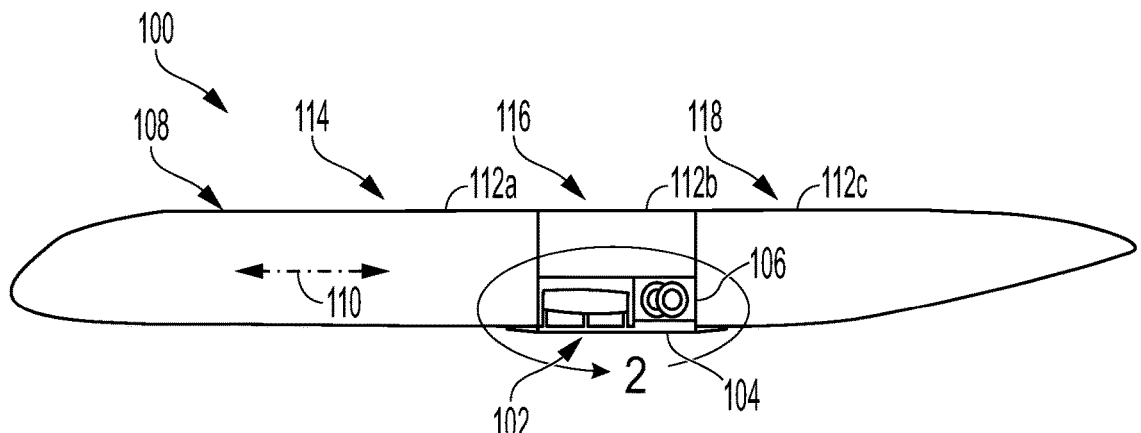
FIG. 1 is a schematic side view of an illustrative keel beam assembly coupled to an illustrative aircraft fuselage.

Various aspects and examples of a keel beam assembly, keel box, aft wheel well bulkhead (AWWB), chord extension, backup structure, aircraft section, aircraft, and associated methods of the present disclosure in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through F, each of which is labeled accordingly.

Overview

The present disclosure provides a keel beam assembly, an aircraft including the keel beam assembly, and a method of aircraft manufacture involving the keel beam assembly. An illustrative keel beam assembly comprises a pair of keel chords extending outside an aircraft fuselage and forming at least part of a lower keel box portion of a keel box. An upper keel box portion of the keel box is coupled to the pair of keel chords and has an aft end engaged with and secured to an aft wheel well bulkhead (AWWB).

In some examples, an aircraft comprises a fuselage, an aft wheel well bulkhead (AWWB), and a keel beam assembly. The keel beam assembly includes a pair of keel chords extending outside the fuselage and forming at least part of a lower keel box portion of a keel box. The keel beam assembly also includes an upper keel box portion of the keel box coupled to the pair of keel chords and having an aft end mounted onto a forward side of the AWWB.

In some examples, a method of aircraft manufacture uses an aircraft section including a fuselage portion coupled to a pair of keel chords. The keel chords extend outside the fuselage portion, form at least part of a lower keel box portion of a keel box, and are coupled to an upper keel box portion of the keel box. In the method, an aft end of the upper keel box portion is mounted onto a forward side of an aft wheel well bulkhead (AWWB).

The relative positional terms "forward," "fore," and "front," as used herein, have the same meaning as one another, and the relative positional terms "rear," "back," "behind," and "aft," as used herein, have the same meaning as one another, unless specified otherwise.

Examples, Components, and Alternatives

The following subsections describe selected aspects of illustrative keel beam assemblies, keel boxes, aft wheel well bulkheads (AWWBs), backup structures, splice configurations, as well as related systems and/or methods. The examples in these subsections are intended for illustration and should not be interpreted as limiting the entire scope of the present disclosure. Each subsection may include one or more distinct examples, and/or contextual or related information, function, and/or structure.

A. Illustrative Aircraft and Keel Beam Assembly

This subsection describes an illustrative aircraft 100 including a keel beam assembly 102 having a keel box 104 mounted onto a forward side of an aft wheel well bulkhead (AWWB) 106 (see FIGS. 1-4). A schematic overview is provided of illustrative aircraft, keel beam assemblies, keel boxes, keel chord extensions, AWWBs, aft backup structures for keel boxes, and mounting/joint configurations, among others. Any of the aircraft, and/or components and features thereof, described in the subsection may be combined with, modified to include, and/or used for, any suitable components, features, or processes described below in subsections B-F. For instance, within examples, the illustrative aircraft 100 can include the keel beam assembly of aircraft 200, 300, 400, 500, 600, 700, or 800.

FIG. 1 shows a schematic side view of keel beam assembly 102 coupled to an aircraft fuselage 108 (interchangeably called a fuselage) of aircraft 100. Fuselage 108 is formed by multiple aircraft sections arranged along a longitudinal axis 110 of aircraft 100 and joined to one another end to end. In the simplified example depicted in FIG. 1, fuselage 108 is formed by respective fuselage portions 112a, 112b, and 112c of only three aircraft sections, namely a forward section 114, a midsection 116, and a rear section 118. However, the fuselage may be formed by any suitable number of forward sections and rear sections, each located either forward or rearward of midsection 116, which itself may include more than one aircraft section. Each aircraft section may have an at least generally cylindrical shape along at least a portion of the section's central axis. Any of the aircraft sections may be sub-assembled separately and then joined to one another, as described further in subsection E.

Figure 2:
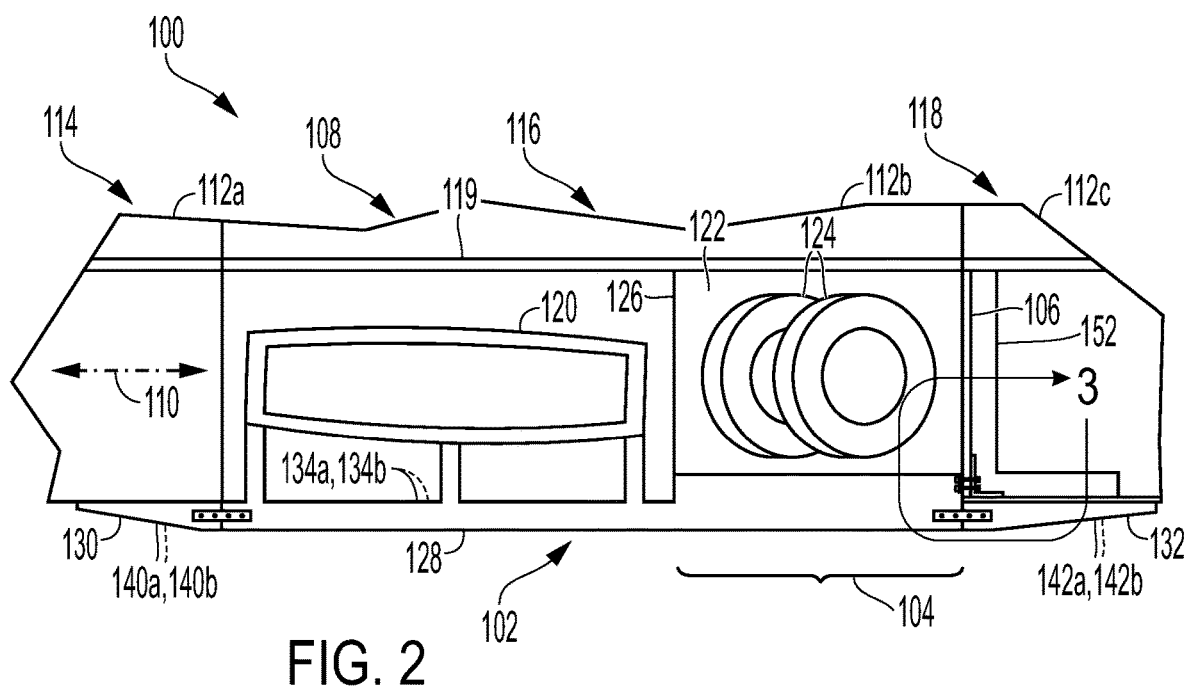
FIG. 2 is a magnified fragmentary schematic side view of the keel beam assembly and aircraft fuselage of FIG. 1, taken generally around the region indicated at "2" in FIG. 1 where an upper portion of a keel box of the keel beam assembly is mounted onto an aft wheel well bulkhead (AWWB) inside the aircraft fuselage, and a lower portion of the keel box is spliced to aft chord extensions outside the aircraft fuselage.

Midsection 116 has a lower portion under a deck 119 of aircraft and including a central wing box 120 and a wheel well 122 (also see FIG. 2). The central wing box provides anchoring sites for wings of aircraft 100. Wheel well 122 houses landing gear such as wheels 124.

Keel beam assembly 102 extends along fuselage 108 from forward section 114 to rear section 118 and connects the forward and rear sections (and midsection 116) to one another, to strengthen and stabilize the fuselage (see FIG. 2). The keel beam assembly is attached to central wing box 120 and, optionally, to at least one wall member 126 defining at least part of wheel well 122.

Keel beam assembly 102 has a central keel beam portion 128 and a pair of end keel beam portions 130, 132 spliced to opposite ends of the central keel beam portion (see FIG. 2). Central keel beam portion 128 extends along the entire length of midsection 116 and is coupled to fuselage portion 112b of the midsection. End keel beam portions 130, 132 are coupled to respective fuselage portions 112a, 112c of forward section 114 and rear section 118. Each end keel beam portion 130, 132 extends along an aft region of forward section 114 (end keel beam portion 130) or along a forward region of rear section 118 (end keel beam portion 132).

Figure 3:
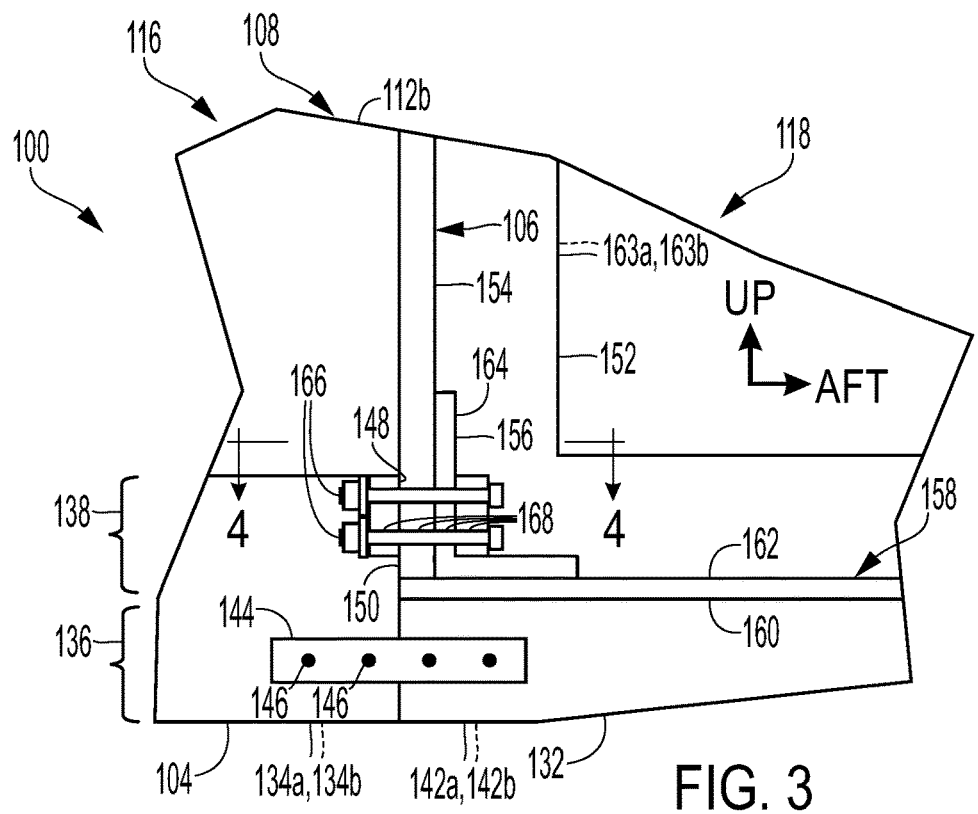
FIG. 3 is a further magnified fragmentary schematic side view of the keel beam assembly and aircraft fuselage of FIG. 1, taken generally around the region indicated at "3" in FIG. 2 and depicting illustrative fasteners securing the upper portion of the keel box to a web of the AWWB and to a backup structure located aft of the AWWB web inside the aircraft fuselage.

Central keel beam portion 128 includes a pair of keel chords 134a, 134b extending outside fuselage 108 (and/or fuselage portion 112b) along longitudinal axis 110 between end keel beam portions 130, 132 (see FIGS. 2 and 3). Keel chords 134a, 134b may be described as primary, major, and/or lower keel chords of keel beam assembly 102. The keel chords form at least part of a lower keel box portion 136 (also called a lower portion) situated under an upper keel box portion 138 (also called an upper portion) of keel box 104 (see FIG. 3). Each keel chord 134a, 134b is located at least predominantly outside fuselage 108 (and/or fuselage portion 112b), which means that more than one-half of the keel chord's mass is situated outside the fuselage or fuselage portion, such as outside an outer mold line defined by the skin/shell of the fuselage or fuselage portion.

Each end keel beam portion 130, 132 includes a pair of chord extensions extending outside fuselage 108 (see FIGS. 2 and 3). End keel beam portion 130 has a pair of forward chord extensions 140a, 140b, and end keel beam portion 132 has a pair of aft chord extensions 142a, 142b. Each chord extension is spliced end-to-end with one of keel chords 134a, 134b using at least one splicing device 144 secured with fasteners 146. For example, a pair of fastener-secured splicing devices, such as splice plates, can join each chord extension to an end of one of the keel chords (see subsections B-D). Each chord extension is located at least predominantly outside fuselage 108 (and/or fuselage portion 112a or 112c), which means that more than one-half of the mass of the chord extension is situated outside the fuselage or fuselage portion, such as outside an outer mold line defined by the skin/shell of the fuselage or fuselage portion.

Figure 4:
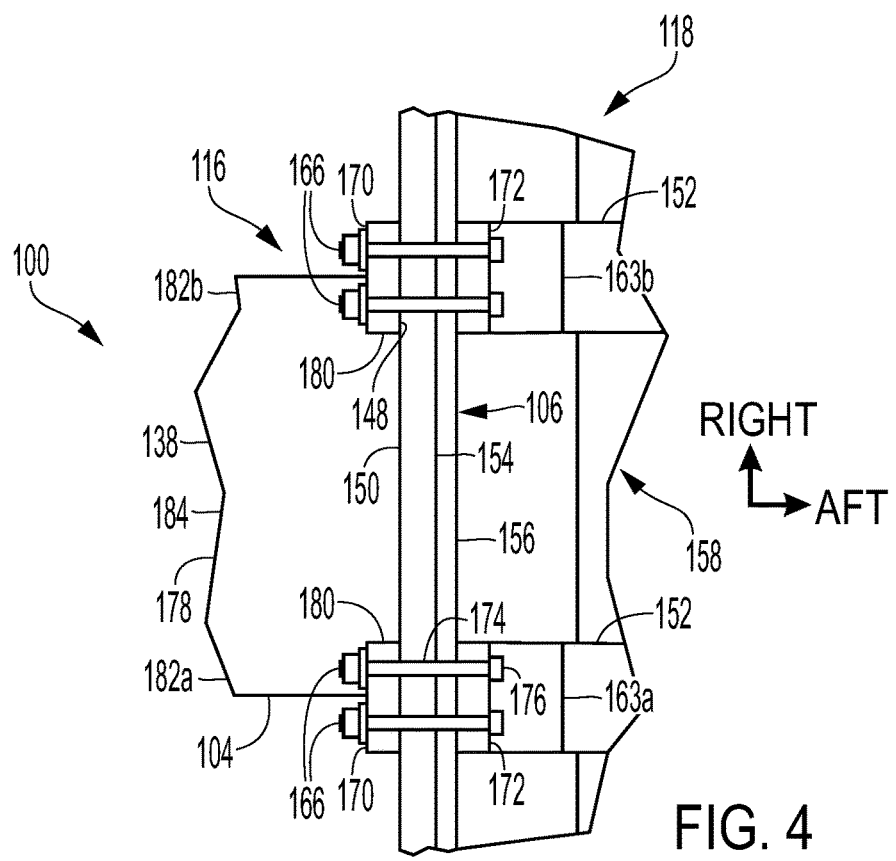
FIG. 4 is fragmentary schematic top view of the keel beam assembly and aircraft fuselage of FIG. 1, taken generally along line 4-4 of FIG. 3 and depicting fasteners securing left- and right-side portions of the upper portion of the keel box to the AWWB web and to respective left and right portions of a backup structure located aft of the AWWB web inside the aircraft fuselage.

Upper keel box portion 138 of keel box 104 is located over aft portions of keel chords 134a, 134b (see FIGS. 2-4). Upper keel box portion 138 is engaged with, secured to, and/or mounted onto aft wheel well bulkhead (AWWB) 106 of rear section 118. More specifically, an aft end 148 of upper keel box portion 138 may be engaged with, secured to, and/or mounted onto a forward side 150 of AWWB 106.

The upper keel box portion has several example purposes. It strengthens and stabilizes the keel beam assembly and helps to share loads with, and transfer and distribute loads between, sections of the fuselage. By mounting the upper keel box portion onto the AWWB, loads are transferred both inside and outside the fuselage at the junction between the midsection and rear section of the aircraft. Furthermore, the upper keel box portion raises the center of mass of the keel box to a position closer to the outer mold line of the fuselage. This configuration advantageously reduces the eccentricity in the keel box-to-fuselage splice, resulting in reduced bending moments in the keel beam runout and connecting fuselage structure, thereby allowing a lighter-weight design.

FIGS. 2-4 schematically illustrate how upper keel box portion 138 may be mounted to AWWB 106 and coupled to a backup structure 152 located in rear section 118, aft of at least part of the AWWB. AWWB 106, interchangeably called an AWWB assembly, includes a web 154 and a frame member 156, each located under deck 119 inside fuselage 108. Frame member 156 extends in a circumferential direction along the edge of web 154 and couples the web to a peripheral portion 158 of rear section 118 including a skin 160 (interchangeably called a shell) over a structural framework 162 (also called a peripheral framework). The structural framework may include an assembly of longitudinal stringers and circumferential frame members located inwardly adjacent the skin.

AWWB 106 also may include additional components. For example, one or more stiffeners, such as horizontal stiffeners, may be attached to web 154, such as mounted on a forward side or an aft side of the web. Alternatively, or in addition, one or more beams, such as vertical beams, may be attached to web 154, such as mounted on an aft side or a forward side of the web. The vertical beams may include a left vertical beam 163a and a right vertical beam 163b, which are aligned respectively with left- and right-side portions of keel box 104. The left and right vertical beams perform a dual function, namely, forming part of AWWB 106 and backup structure 152. Accordingly, these two vertical beams can be described as being included in AWWB 106 or backup structure 152. Subsections B-D provides further examples of an AWWB including horizontal stiffeners and vertical beams. The term "vertical beam," as used in this disclosure, means a beam defining a long axis that is within 20 degrees of exactly vertical. Any vertical beam of the present disclosure may be described as a "transverse beam," which is a beam having its long axis oriented transverse (e.g., orthogonal) to longitudinal axis 110 of the aircraft.

Backup structure 152 may include any suitable number of structural members, such as beams or struts, each arranged vertically, horizontally, or obliquely. The backup structure may include left and right backup portions that are engaged with, secured to, and/or mounted onto an aft side 164 of web 154 and/or peripheral portion 158 of rear section 118.

Fasteners 166 secure upper keel box portion 138 to AWWB 106 (see FIGS. 3 and 4). Each fastener 166 extends into and/or through a set of aligned apertures 168, which may be coaxial with one another. The apertures of the set may, for example, be defined by a flange 170 of upper keel box portion 138, AWWB 106 (e.g., by web 154 and/or frame member 156), and a flange 172 of backup structure 152. The fastener may be a single piece, such as a bolt 174 in threaded engagement with an internal thread of the aft-most or forward-most aperture of the set of apertures 168. Alternatively, the fastener may be a fastener assembly of two or more pieces, such as bolt 174 in threaded engagement with a nut 176. In other examples, the fastener may include a pin, rivet, anchor, or the like. In yet other examples, the upper keel box portion may be secured to the AWWB without fasteners, such as by welding. In some examples, the upper keel box portion has a pair of side portions spaced laterally from one another, and each side portion is separately bolted through a web of the AWWB to a backup structure engaged with an aft side of the web and secured to a peripheral portion of the fuselage. In some examples, each side portion is bolted through the web to a respective vertical beam of the backup structure.

Upper keel box portion 138 has a body 178 fastened to a pair of brackets 180 (see FIG. 4). Flanges 170 may be part of brackets 180 and engaged with forward side 150 of AWWB 106. The upper keel box portion includes a pair of side portions 182a, 182b (i.e., left- and right-side portions) that are spaced laterally from one another, and an upper portion 184 that connects the side portions to one another. Brackets 180 may be used to receive fasteners 166 that separately fasten, such as bolt, each side portion 182a, 182b to AWWB 106. Upper portion 184 also may be fastened to AWWB 106 separately from side portions 182*a*, 182*b* (see subsections B-D).

B. Illustrative Keel Beam Assembly, Mounting Configuration, and Backup Structure This subsection describes an illustrative keel beam assembly 202, keel box 204, AWWB 206, mounting configuration, and backup structure 252 of an aircraft 200; see FIGS. 5-10.

Figure 5:
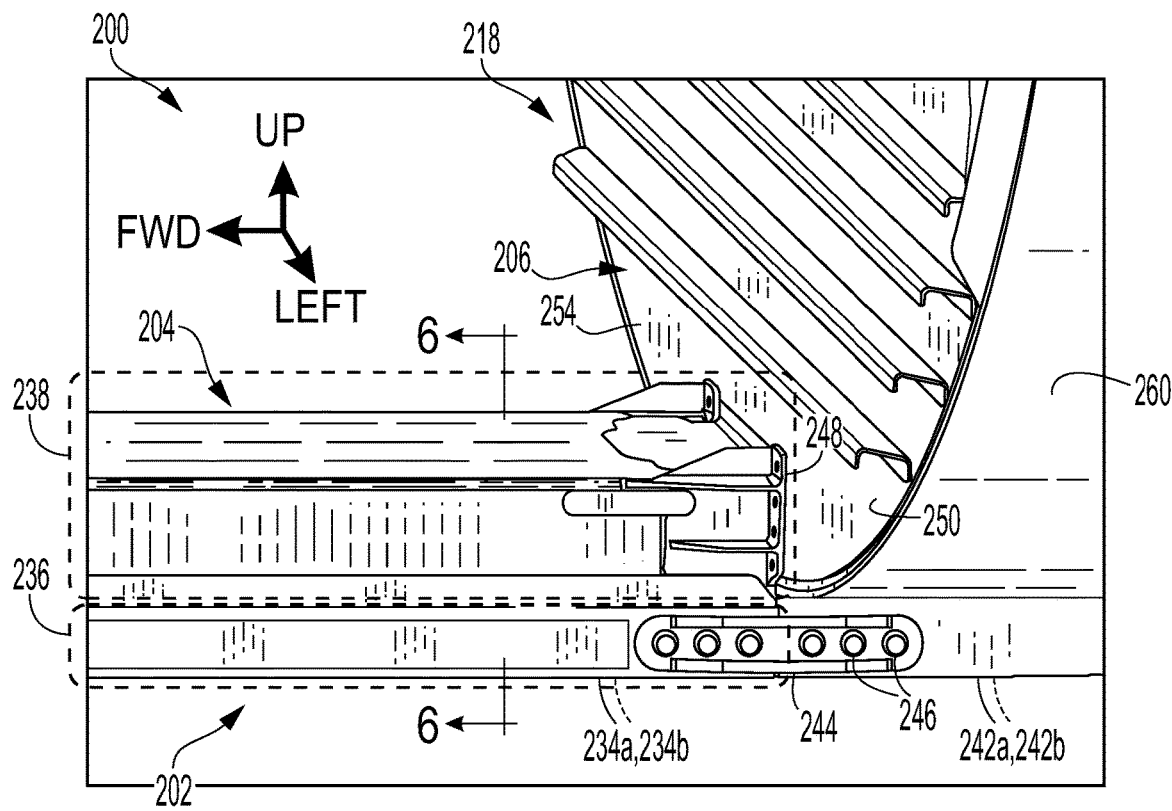
FIG. 5 is a fragmentary oblique side view of an illustrative, somewhat simplified keel beam assembly coupled to an aircraft fuselage, taken around an aft portion of a keel box of the keel beam assembly and a lower forward portion of an aft aircraft section coupled to an AWWB.

FIG. 5 shows an aft portion of keel box 204 of keel beam assembly 202 coupled to a rear section 218 of aircraft 200. A lower keel box portion 236 and an upper keel box portion 238 of keel box 204 are generally indicated by a pair of dashed boxes. An aft end 248 of upper keel box portion 238 is mounted onto a forward side 250 of aft wheel well bulkhead (AWWB) 206 and engaged with a web 254 of the AWWB.

Figure 6:
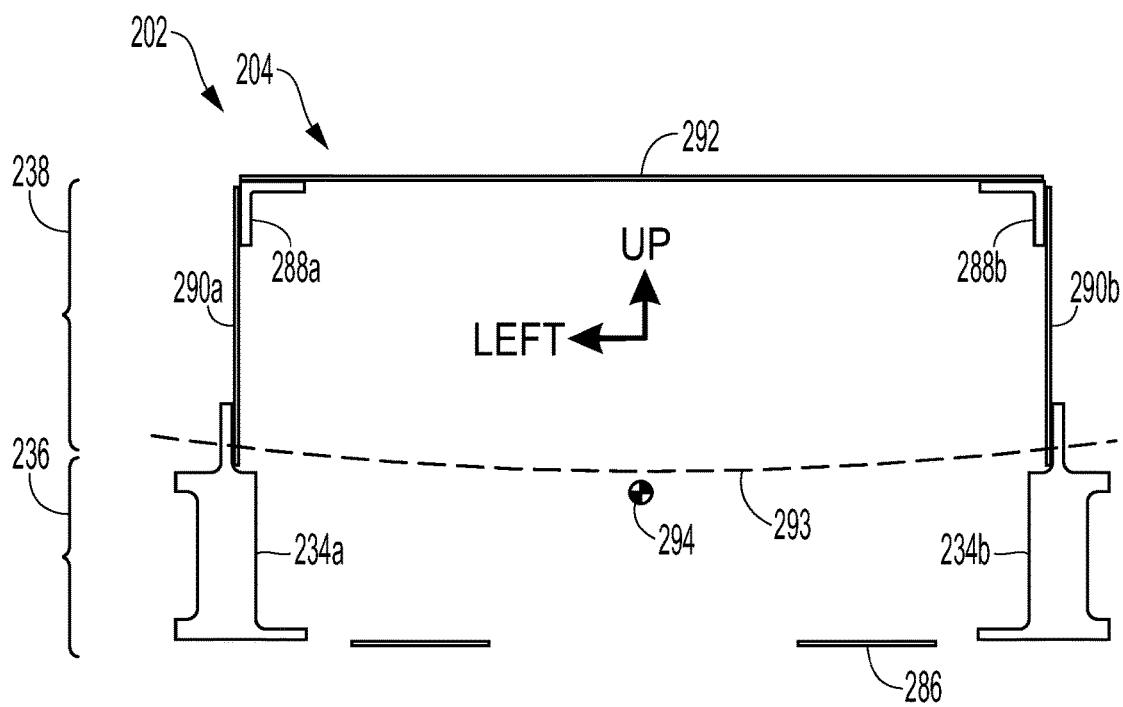
FIG. 6 is a sectional view of the keel box of FIG. 5, taken generally along line 6-6 of FIG. 5 through the keel box.

FIG. 6 shows a sectional view of keel box 204, which is hollow. The vertical extents of lower keel box portion 236 and upper keel box portion 238 are indicated. Lower keel box portion 236 is formed at least in part by lower keel chords 234*a*, 234*b* and a lower web 286. Upper keel box portion 238 includes upper keel chords 288*a*, 288*b*, side webs 290*a*, 290*b*, and upper web 292. In at least an aft portion of keel box 204, upper keel chords 288*a*, 288*b* are significantly thinner and lighter than lower keel chords 234*a*, 234*b*, and under normal flight conditions may bear only a minor fraction of the load on the keel box. For example, in the aft portion of keel box 204, the upper keel chords may have a mass per unit length and/or a thickness that is less than 50% that of the lower keel chords. Within examples, the upper keel chords may have a mass per unit length and/or a thickness that is less than 25%, 20%, 15%, or 10% that of the lower keel chords. The aft portion of the keel box is located adjacent the AWWB and has a length that is less than 50% of the full length of the keel box. Within examples, the aft portion of the keel box has a length that is less than 33% or 25% of the full length of the keel box.

The position of a fragmentary portion of an envelope 293 (also called a trace or skin line) defined by fuselage 208 of aircraft 200 is indicated with a dashed line. Envelope 293 is defined by the exterior surface of skin 260 of the fuselage. The envelope corresponds to the exterior surface of the skin, and theoretical extension or a projected profile of the exterior surface across open regions adjacent the exterior surface where the skin does not physically exist (e.g., where small or large openings are formed in the skin). Keel box structure above the dashed line is located in the fuselage (i.e., inside envelope 293), while keel box structure below the dashed line is located outside the fuselage (i.e., outside envelope 293). Accordingly, lower keel box portion 236 is located outside the fuselage, and upper keel box portion 238 is located inside the fuselage. A center of mass 294 of an aft portion of keel box 204, also called the aft portion's centroid or center of gravity, is situated close to the fuselage exterior (formed by the fuselage shell/skin). Within examples, the center of mass 294 is located less than 10 centimeters from envelope 293. Within examples, the center of mass 294 is located less than 4, 3, or 2 centimeters from envelope 293. Positioning the center of mass of the aft portion of the keel box near the fuselage exterior can be advantageous to reduce eccentricity of the keel box-to-fuselage splice, thereby reducing bending moments of the keel beam assembly at high loads.

Figure 7:
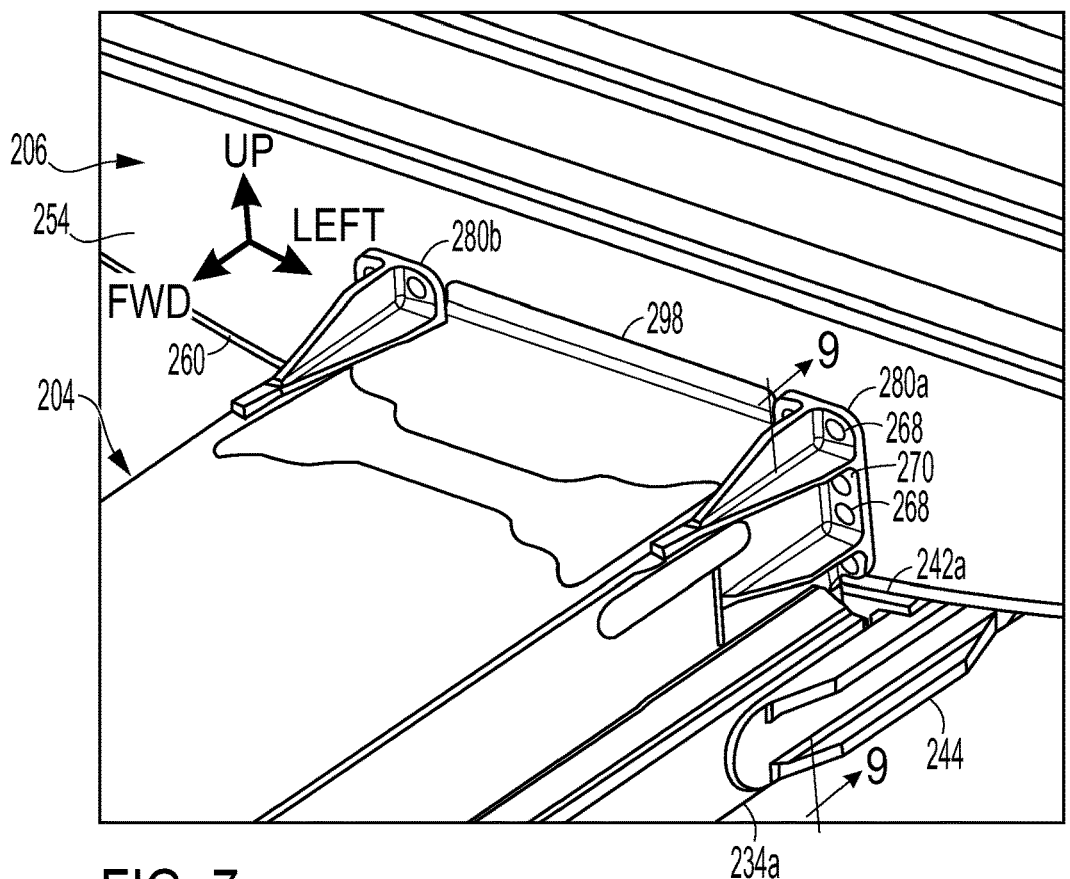
FIG. 7 is another fragmentary oblique view of the keel beam assembly, AWWB, and aircraft fuselage of FIG. 5.
Figure 9:
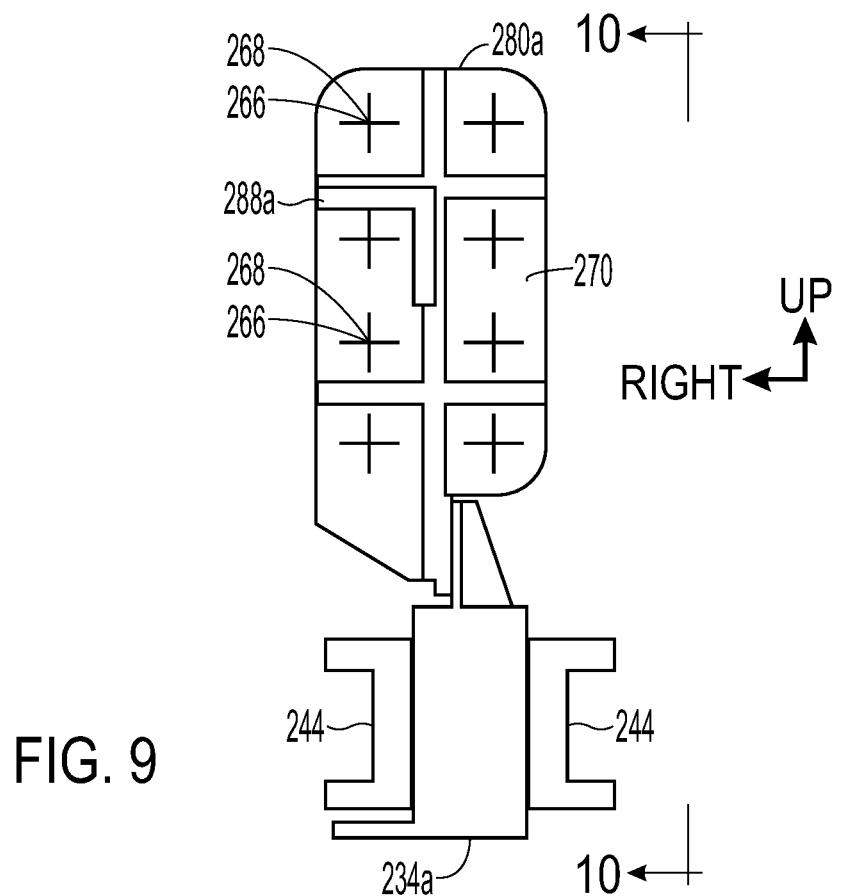
FIG. 9 is a fragmentary schematic sectional view of the keel beam assembly of FIG. 5, taken generally along line 9-9 of FIG. 7 around a right-side portion of the keel box.

A pair of brackets 280*a*, 280*b* enable mounting opposite side portions of the upper keel box portion to AWWB 206 (see FIGS. 7 and 9). Each bracket 280*a*, 280*b* has a flange 270 engaged with web 254 of AWWB 206. The flange defines apertures 268 to receive fasteners 266 that extend through the flange and the AWWB web. In FIG. 9, the positions and orientations of apertures 268, and fasteners 266 received in the apertures, are indicated schematically with crosses. In this schematic convention, each cross indicates the presence of an aperture, or two or more coaxial apertures, defining an aperture axis parallel to the viewing direction of the drawing. The cross also indicates a fastener received in the aperture(s) along the aperture axis. The same schematic convention is used for drawings described in subsections C and D.

In the depicted example, each bracket 280*a*, 280*b* defines two columns of four apertures 268 each, but more or fewer apertures and fasteners may be used in other examples. Each bracket 280*a*, 280*b* may be aligned vertically with a corresponding upper keel chord 288*a*, 288*b* and a corresponding lower keel chord 234*a*, 234*b*, as shown for bracket 280*a*, upper keel chord 288*a*, and lower keel chord 234*a* in FIG. 9 (also see FIG. 6).

Upper keel box portion 238 also may be secured to AWWB 206 along an upper region of the upper keel box portion at positions intermediate to brackets 280*a*, 280*b* (see FIG. 7). The upper region forms a central flange 298 engaged with the AWWB. The central flange may define apertures to receive fasteners that extend into and/or through AWWB 206.

Lower keel chords 234*a*, 234*b* are spliced to aft chord extensions 242*a*, 242*b* under upper keel box portion 238 and rear section 218 (see FIGS. 5-9). A pair of splice plates 244 are mounted on opposite sides of each lower keel chord and corresponding chord extension using fasteners 246, to join the lower keel chord and the chord extension to one another axially.

Figure 8:
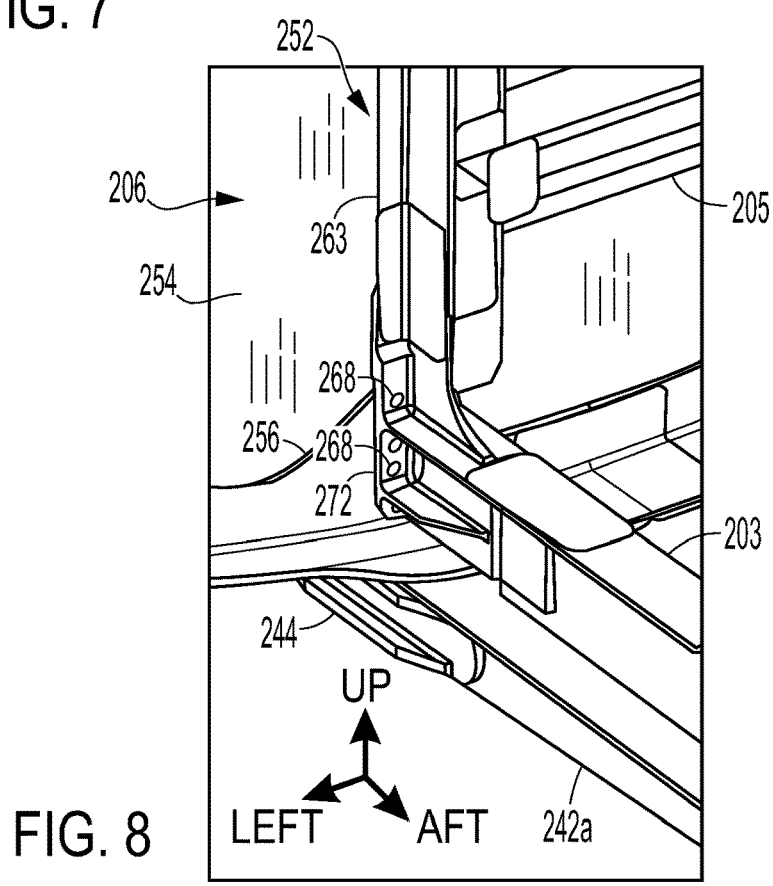
FIG. 8 is yet another fragmentary oblique view of the keel beam assembly, aircraft fuselage, and AWWB of FIG. 5, taken from a position in the aft aircraft section toward the AWWB, with the fuselage's structural framework and skin removed.
Figure 10:
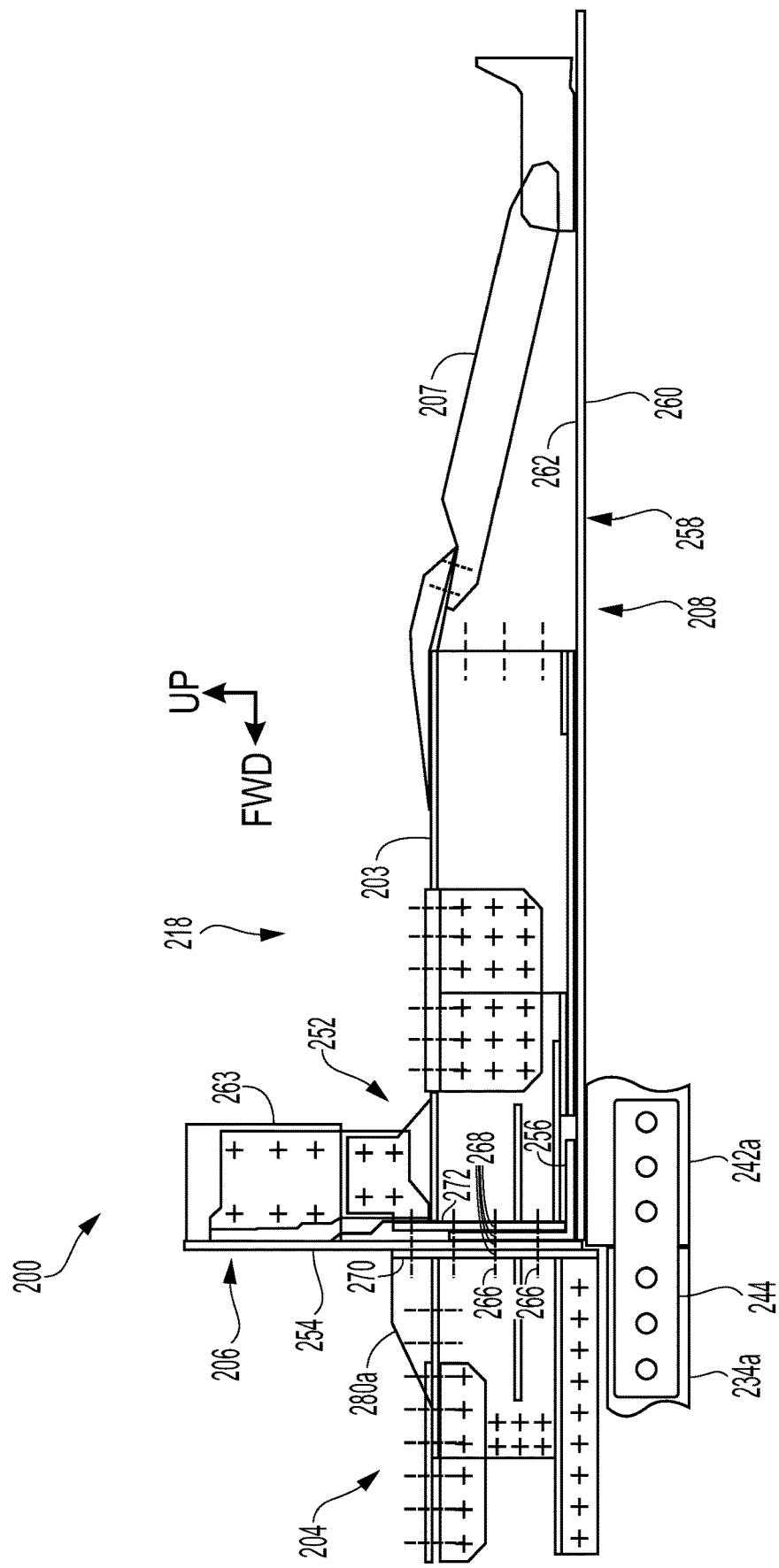
FIG. 10 is a schematic fragmentary side view of the keel box, AWWB, and aft aircraft section of FIG. 5.

FIGS. 8 and 10 show an illustrative backup structure 252 located in rear section 218. In FIG. 8, the skin and structural framework of the rear section have been removed. In FIG. 10, crosses indicate positions of apertures/fasteners having axes parallel to the viewing direction, as described above, while sets of parallel dashed lines indicate positions of aperture/fasteners having axes orthogonal to the viewing direction.

Backup structure 252 has a backup flange(s) 272 defining apertures 268 that are coaxial with corresponding apertures 268 defined by keel flange 270 of each bracket 280*a*, 280*b*, and by web 254 and frame member 256 of AWWB 206. Fasteners 266 received in sets of coaxially aligned apertures 268 secure each of the brackets (and thus opposite side portions of the upper keel box portion) to the backup structure through AWWB 206.

The backup structure depicted has a left portion aligned with bracket 280*a*, and a right portion aligned with bracket 280*b* (also see FIG. 7). Each of the left and right portions includes a vertical beam 263, a horizontal beam 203, and a strut 207 coupled to one another. The vertical beam is mounted onto an aft side of AWWB web 254 and has a lateral position, defined by its distance from a plane of symmetry of the aircraft, matching that of the corresponding bracket, one of the upper keel chords, one of the lower keel chords, and one of the aft chord extensions. The horizontal beam also has a lateral position matching that the same structures and is elongated parallel to the longitudinal axis of the aircraft, along a peripheral portion 258 of rear section 218 that includes a skin 260 and a structural framework 262 (also called a peripheral framework) located inwardly adjacent the skin. A transverse beam 205 is secured to, and extends horizontally between the left and right portions of backup structure 252, to stabilize the backup structure (see FIG. 8). The backup structure spans two frame bays (see FIG. 10). In other instances, the backup structure spans at least one frame bay, only one frame bay, or less than one frame bay.

C. Other Illustrative Keel Beam Assemblies, AWWBs, and Backup Structures

This subsection describes other illustrative keel beam assemblies, AWWBs, and backup structures; see FIGS. 11-16. Similar to the illustrative keel beam assemblies of subsections A and B, within examples of the illustrative keel beam assemblies of subsection C, an aft portion of the keel box has a center of mass located close to an envelope defined by an exterior surface of a skin of the aircraft fuselage.

With the splicing configuration of subsection B, a thick flange of the aft chord extensions, and the thick skin over the aft chord extensions drive high loads into a lower portion of the splice structure. The aft splicing configuration presented in this subsection differs from that described in subsection B, by splicing only the upper and lower keel chords at the AWWB interface, which can provide better access and/or simplify/facilitate assembly of the splice structure, by removing overlapping structural elements.

Figure 11:
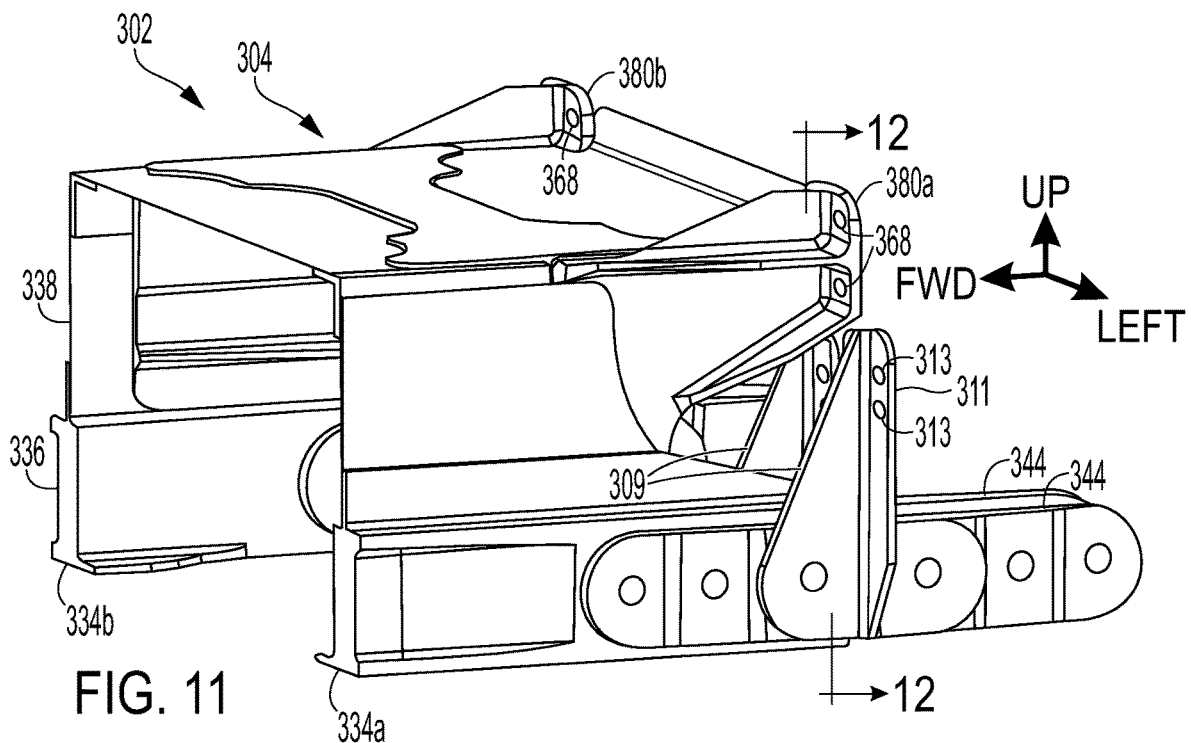
FIG. 11 is an oblique sectional view of another exemplary keel beam assembly, taken in isolation around an aft portion of a keel box of the keel beam assembly.

FIG. 11 shows an aft portion of a keel box 304 of a keel beam assembly 302. Keel box 304 is structured generally as described above in subsection B for keel box 204. Keel box 304 has a pair of lower keel chords 334a, 334b forming at least part of lower keel box portion 336 of keel box 304. An upper keel box portion 338 of keel box 304 has a pair of brackets 380a, 380b each defining apertures 368 for receiving fasteners 366 to mount the bracket, and thus the upper keel box portion, to an aft wheel well bulkhead (AWWB) (also see FIG. 12). However, each bracket 380a, 380b is engaged with a smaller vertical extent of the AWWB than the brackets of keel box 204 of subsection B.

A pair of splice plates 344 are mounted to opposite sides of each lower keel chords 334a, 334b. Each splice plate has a stepped shape, with the thickness of the plate increasing towards its longitudinal center where a clip 309 is attached. Each clip 309 is configured to be mounted onto an AWWB at a position under a bracket 380a or 380b (see FIGS. 11 and 12) and stabilizes lower keel chords 334a, 334b. The clip has a clip flange 311 to engage the forward side of the AWWB and defines apertures 313 to receive fasteners 315 that secure the clip to the AWWB and a backup structure behind the AWWB. The clip may be formed separately from, or integrally with, the corresponding splice plate. Clips 309 stabilize the lower keel chords, and in conjunction with brackets 380a, 380b, are advantageous because they provide better load distribution, which reduces the undesirably high loads that can be driven into the lower portion of the keel box/AWWB splice structure.

Figure 13:
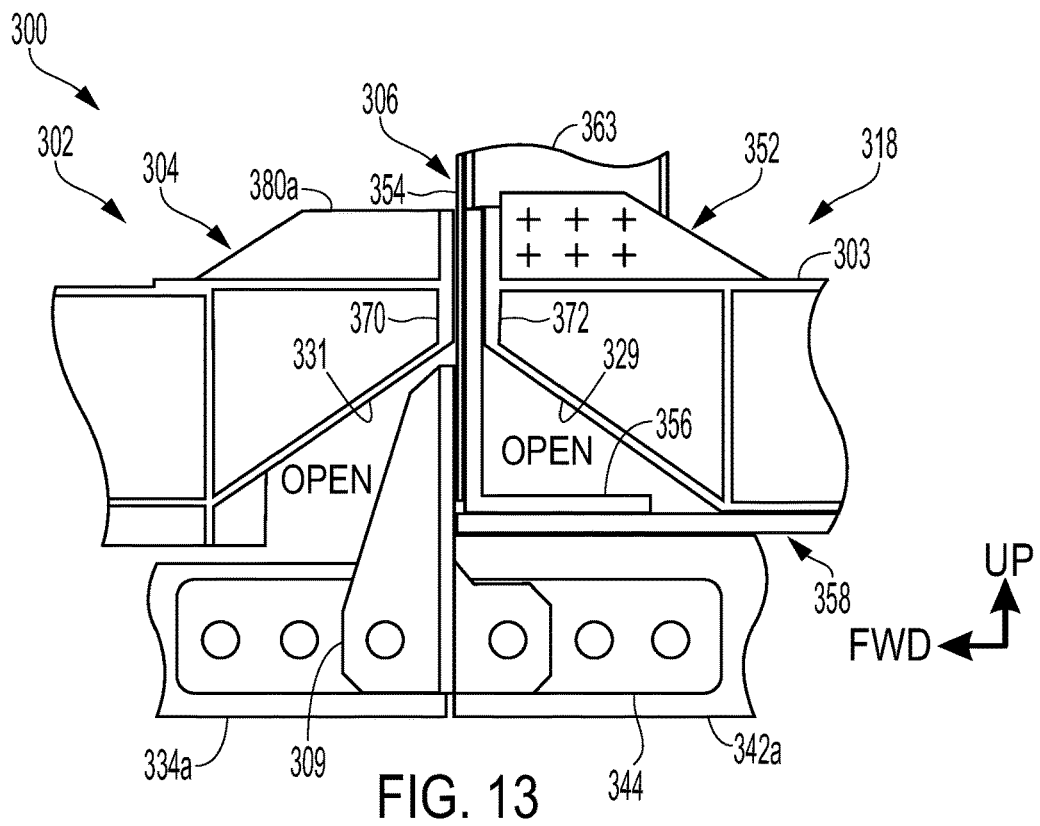
FIG. 13 is a fragmentary side view of the keel beam assembly of FIG. 11 mounted to a web of an AWWB and to an illustrative backup structure rearwardly adjacent the AWWB web.

FIG. 13 shows a fragmentary view of an aircraft 300 including keel beam assembly 302 coupled to a rear section 318 of the aircraft that includes a backup structure 352. Two regions that are empty space are indicated with the word "open". Bracket 380a and clip 309 are engaged with, and mounted onto, a web 354 of an AWWB 306 of rear section 318. Splice plate 344 under clip 309 is secured to lower keel chords 334a and to an aft chord extension 342a using fasteners, to splice the lower keel chord to the aft chord extension.

Figure 12:
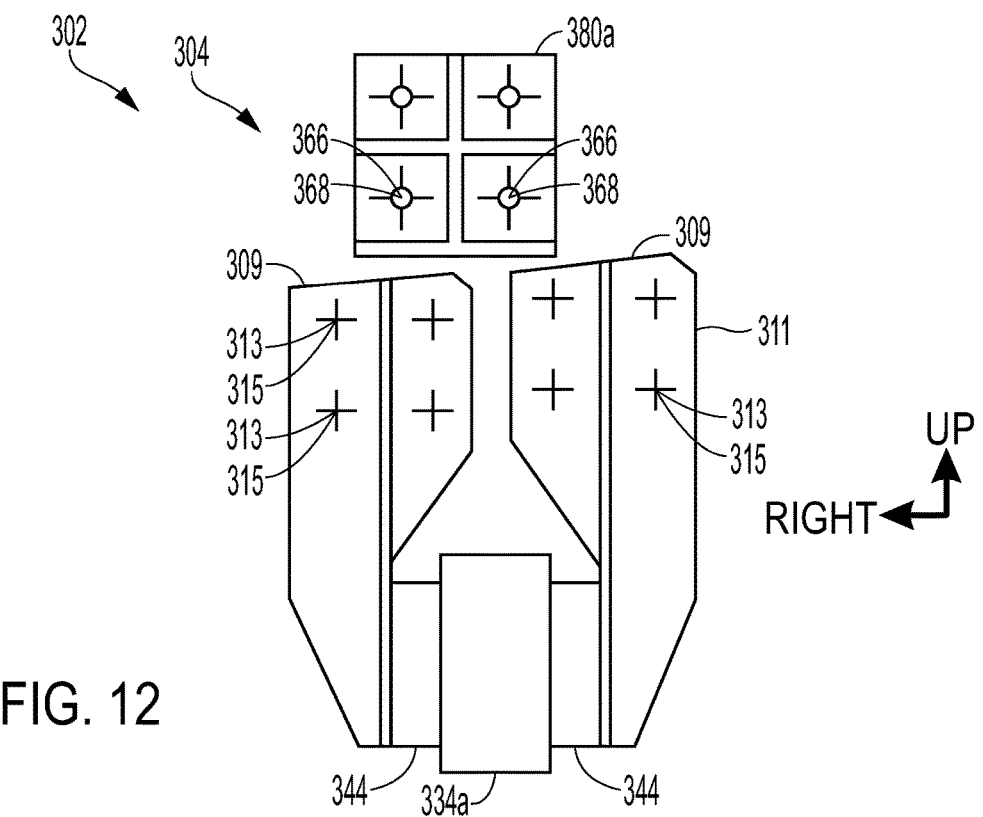
FIG. 12 is a fragmentary schematic sectional view of only a right-side portion of the keel box, taken generally along line 12-12 of FIG. 11.

Each bracket 380a, 380b is secured to backup structure 352 through AWWB 306 using fasteners (also see FIGS. 11 and 12). Each of the fasteners extends through a keel flange 370 provide by one of the brackets, web 354, frame member 356, and a backup flange 372 provided by an integration fitting of backup structure 352. Further aft, the backup structure may be similar to that described above in subsection B.

Backup structure 352 has left and right portions each including a vertical beam 363 and a horizontal beam 303 coupled to one another, as described above in subsection B for backup structure 252. Horizontal beam 303 is arranged longitudinally in the aircraft and is mounted to a peripheral portion 358 of the fuselage. Each of the portions of the backup structure, and each bracket 380a, 380b, has an oblique wall 329 or 331 extending obliquely away from AWWB 306 to form an open region under the oblique wall.

Figure 14:
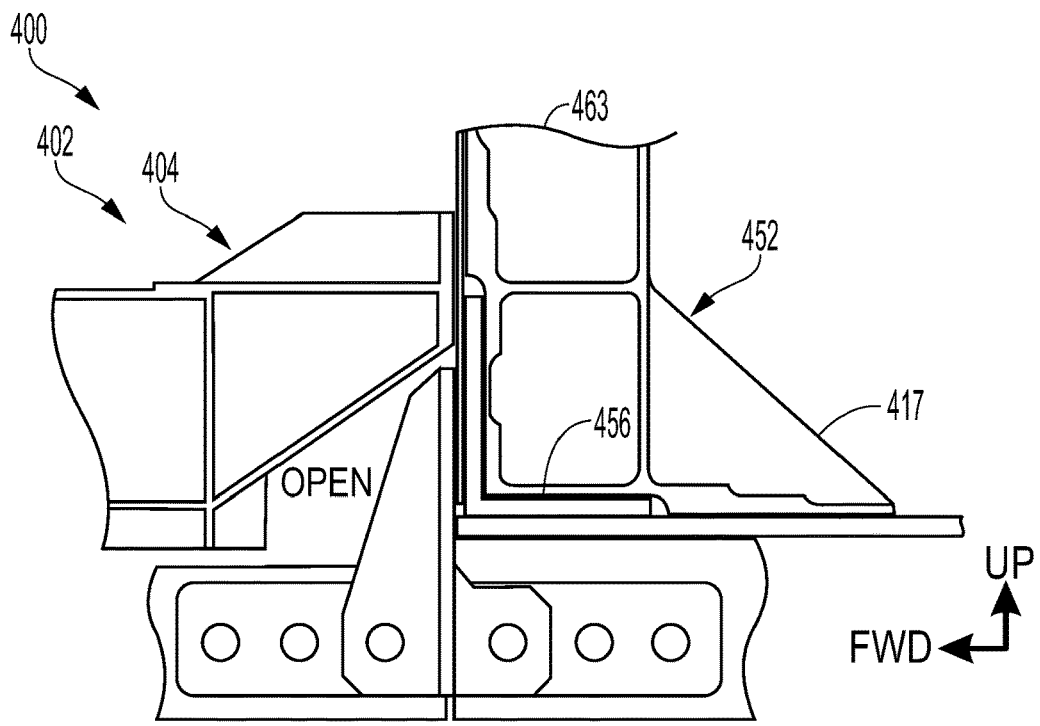
FIG. 14 is a fragmentary side view of the keel beam assembly of FIG. 11 mounted to a web of an AWWB and to another illustrative backup structure rearwardly adjacent the AWWB web.

FIG. 14 shows a fragmentary view of an aircraft 400 including a keel beam assembly 402 coupled to a rear section of the aircraft that includes a backup structure 452. Keel beam assembly 402 has a keel box 404 that is identical to keel box 304 (see FIG. 13), but backup structure 452 is different from backup structure 352. More specifically, like backup structure 352, backup structure 452 has left and right portions aligned with corresponding brackets of the keel box. However, each portion has a vertical beam 463 equipped with a foot 417 (also called a boot) that projects aft along the skin and structural framework of the rear section. The horizontal beam present in backup structure 352 has been eliminated in backup structure 452. Also, vertical beam 463 fits closely over frame member 456 such that the oblique wall of the backup structure and the opening under this oblique wall are eliminated (compare with FIG. 13).

Figure 15:
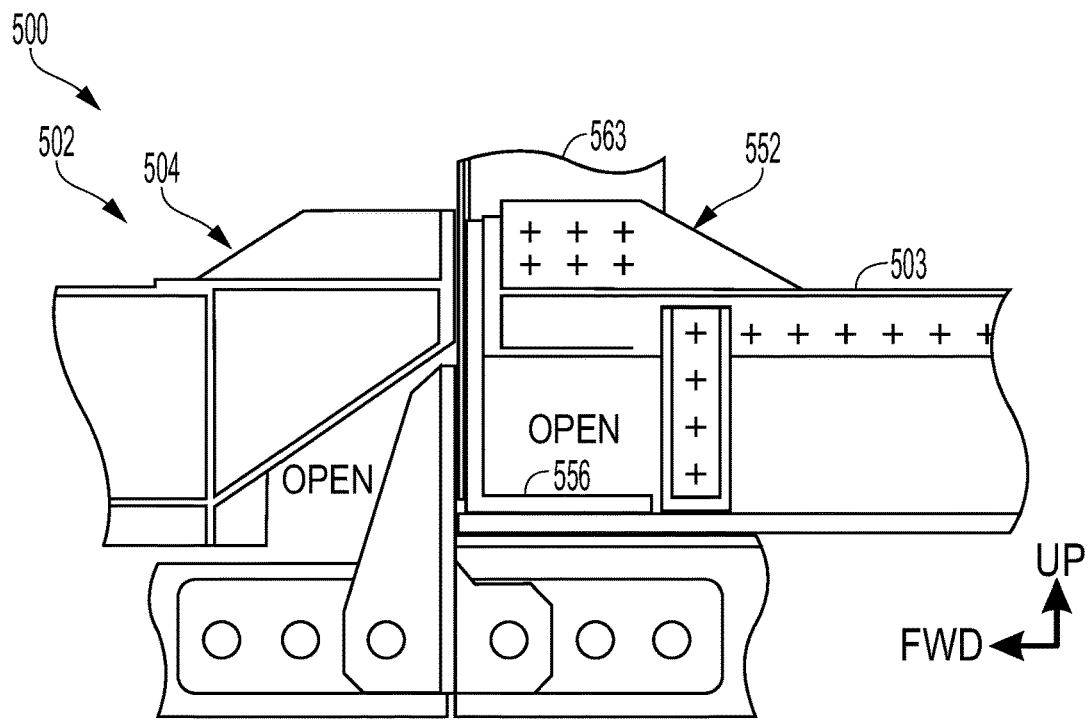
FIG. 15 is a fragmentary side view of the keel beam assembly of FIG. 11 mounted to a web of an AWWB and to yet another illustrative backup structure rearwardly adjacent the AWWB web.

FIG. 15 shows a fragmentary view of an aircraft 500 including a keel beam assembly 502 coupled to a rear section of the aircraft that includes a backup structure 552. Keel beam assembly 502 has a keel box 504 that is identical to keel box 304 (see FIG. 13), but backup structure 552 is different from backup structure 352. More specifically, like backup structure 352, backup structure 552 has left and right portions aligned with corresponding brackets of the keel box. Each of the left and right portions has a vertical beam 563 coupled to a horizontal beam 503. However, unlike backup structure 352, backup structure 552 and a frame member 556 collectively define a rectangular opening, instead of a triangular opening.

Figure 16:
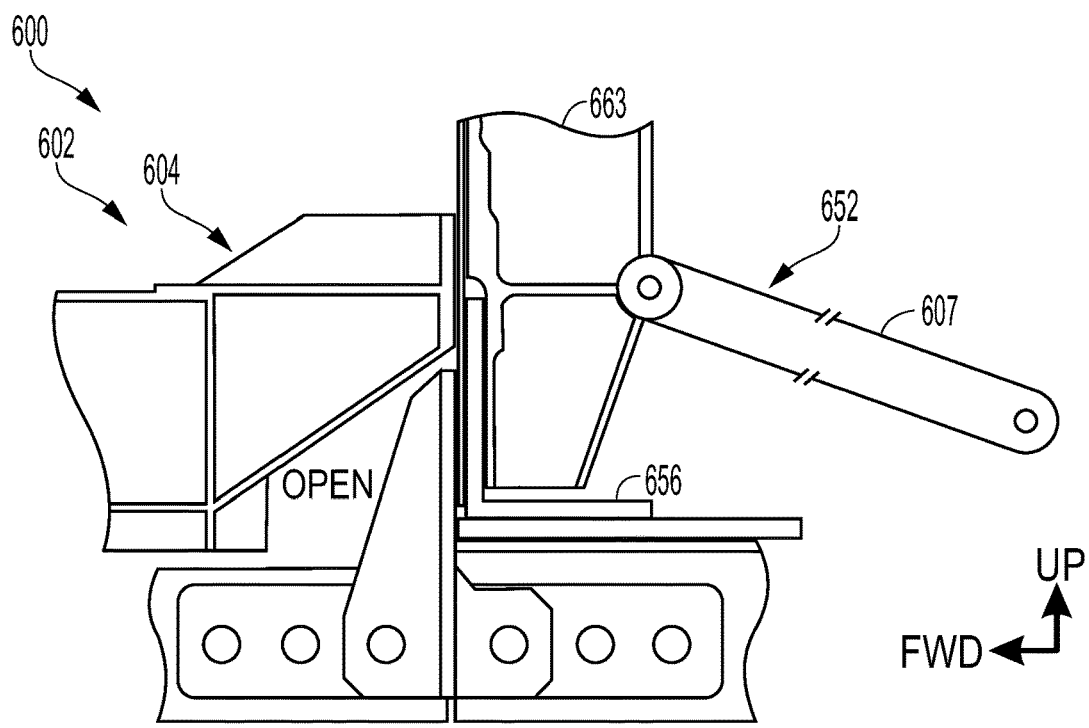
FIG. 16 is a fragmentary side view of the keel beam assembly of FIG. 11 mounted to a web of an AWWB and to still another illustrative backup structure rearwardly adjacent the AWWB web.

FIG. 16 shows a fragmentary view of an aircraft 600 including a keel beam assembly 602 coupled to a rear section of the aircraft that includes a backup structure 652. Keel beam assembly 602 has a keel box 604 that is identical to keel box 304 (see FIG. 13), but backup structure 652 is different from backup structure 352. More specifically, like backup structure 352, backup structure 652 has left and right portions aligned with corresponding brackets of the keel box. Each of the left and right portions has a vertical beam 663, which fits closely over a frame member 656 along a vertical portion of the frame member but may be spaced from a horizontal portion of the frame member, for instance, to form a gap. In other examples, no gap is formed. Moreover, unlike backup structure 352, there is no horizontal beam. Instead, an oblique strut 607 couples vertical beam 663 to a peripheral portion of the rear section.

D. Further Illustrative Keel Beam Assemblies, AWWBs, and Backup Structures

Figure 17:
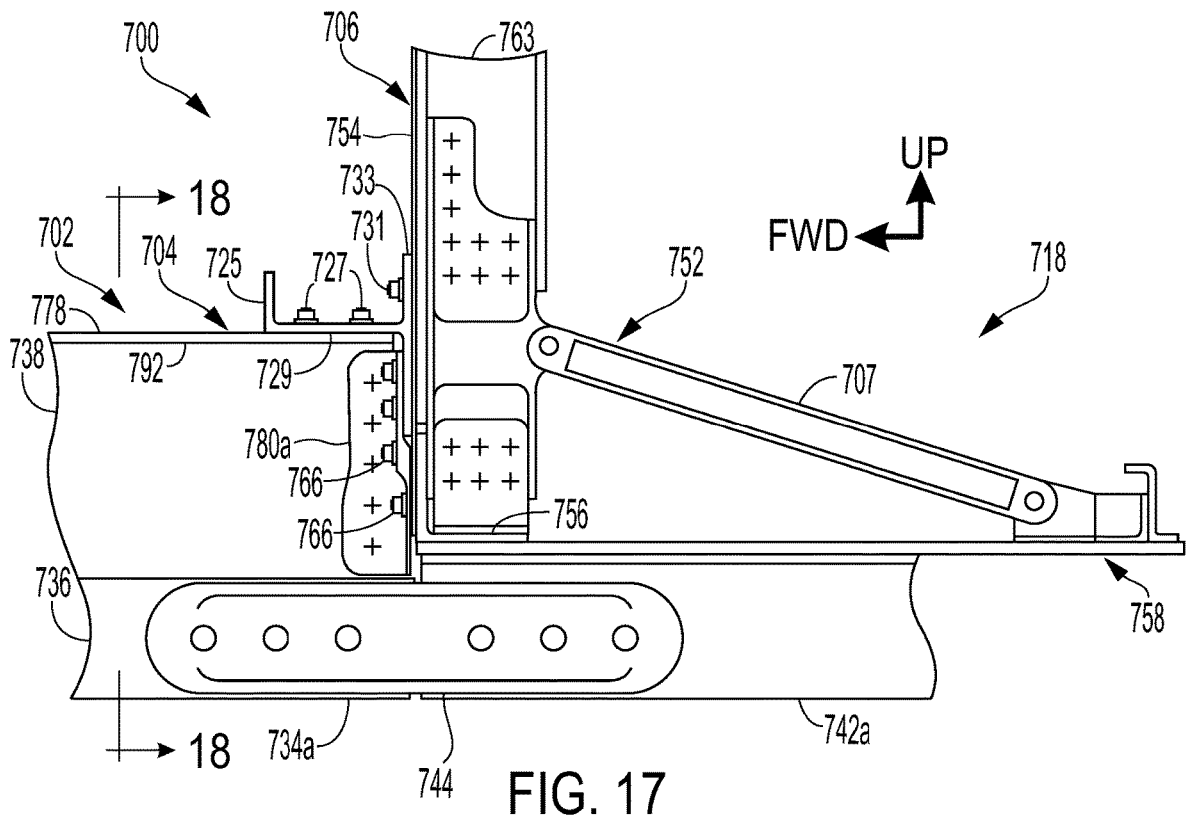
FIG. 17 is a fragmentary schematic view of another illustrative keel beam assembly, AWWB, and backup structure for an aircraft.
Figure 18:
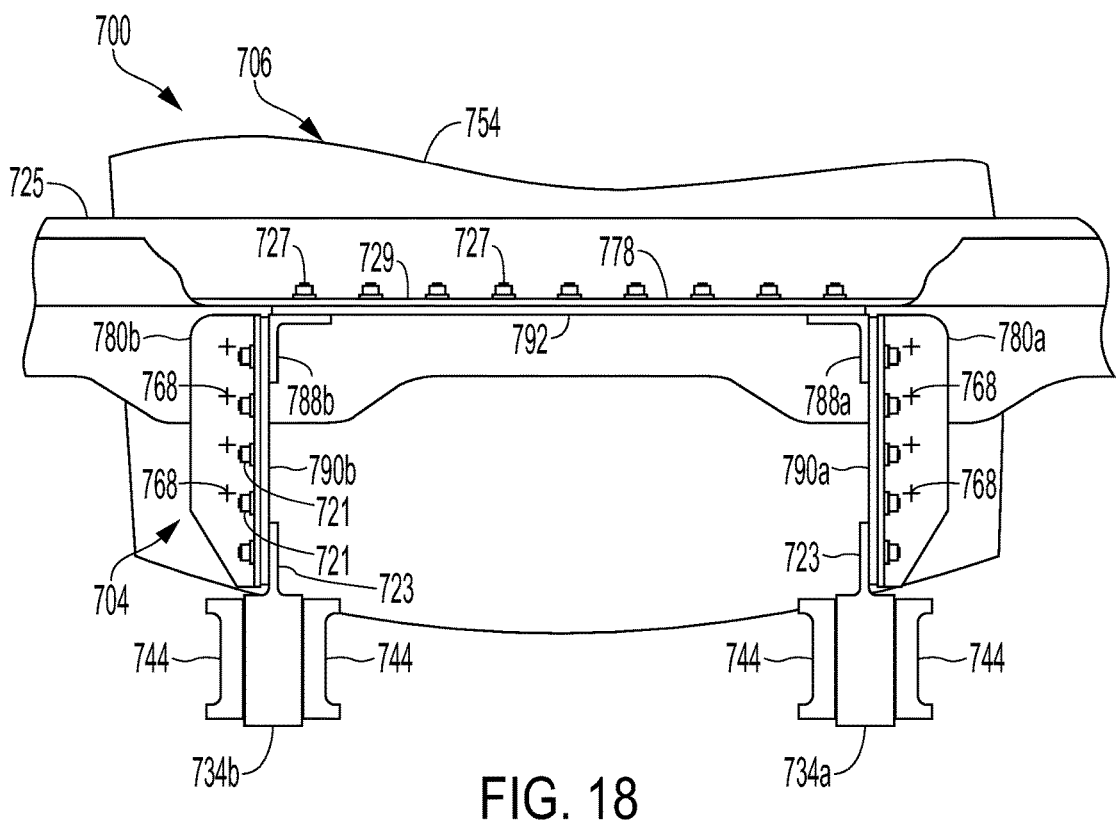
FIG. 18 is a fragmentary schematic sectional view of the keel beam assembly and AWWB of FIG. 17, taken generally along line 18-18 of FIG. 17.
Figure 19:
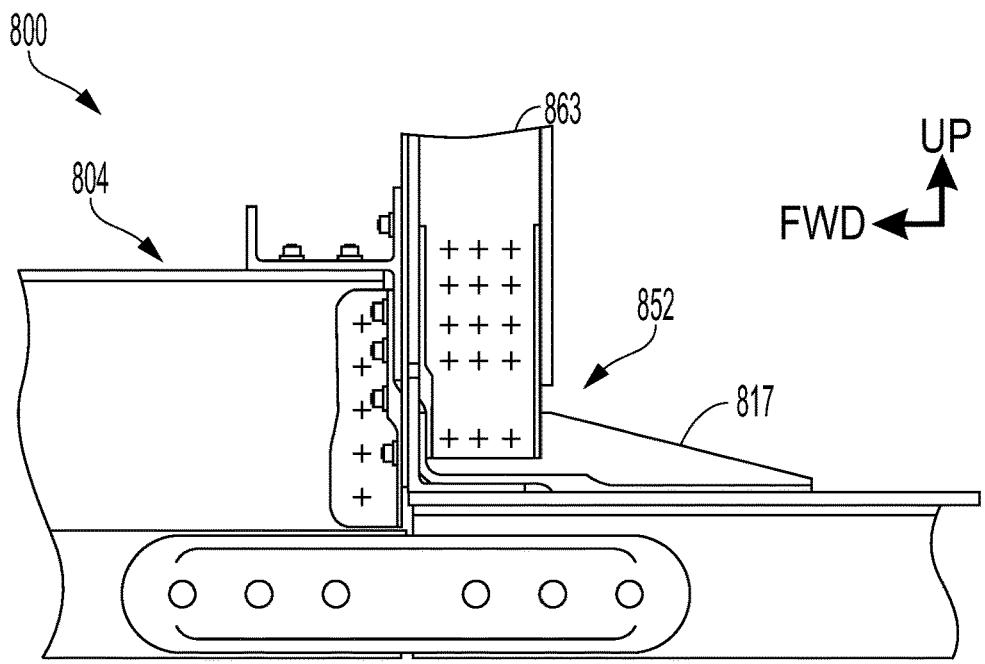
FIG. 19 is another fragmentary schematic view of the keel beam assembly and AWWB of FIG. 17, taken with another illustrative backup structure rearwardly adjacent a web of the AWWB.

This subsection describes further illustrative keel beam assemblies, AWWBs, and backup structures; see FIGS. 17-19. Similar to the illustrative keel beam assemblies of subsections A, B, and C, within examples of the illustrative keel beam assemblies of subsection D, an aft portion of the keel box has a center of mass located close to an envelope defined by an exterior surface of a skin of the aircraft fuselage.

FIGS. 17 and 18 show fragmentary views of an aircraft 700 taken around an aft portion of a keel box 704 of a keel beam assembly 702 and a forward portion of a rear section 718 of the aircraft. Keel box 704 has a lower keel box portion 736, formed at least in part by lower keel chords 734a, 734b, and an upper keel box portion 738. Lower keel chords 734a, 734b are spliced to aft chord extensions using splice plates 744, as depicted in FIG. 17 for lower keel chord 734a and aft chord extension 742a, and as described in more detail above in subsections A-C.

Upper keel box portion 738 is mounted onto an AWWB 706 of rear section 718 along opposite side portions and along an upper portion. A pair of brackets 780a, 780b are fastened to opposite side portions of a body 778 of the upper keel box portion using fasteners 721. More specifically, each bracket is fastened at an upper keel chord 788a or 788b, a side web 790a or 790b, and/or a chord flange 723 of a lower keel chord 734a or 734b. Each bracket 780a, 780b defines apertures 768 for fasteners 766 that extend through a web 754 and/or a frame member 756 of AWWB 706 to a backup structure 752, such that the bracket is secured to the backup structure through the AWWB. An upper portion of body 778 of upper keel box portion 738 is secured to a horizontal stiffener 725 of AWWB 706. More specifically, fasteners 727 secure a horizontal ledge 729 of horizontal stiffener 725 to an upper web 792 and upper keel chords 788a, 788b of body 778. Other fasteners, such as a fastener 731, secure a stiffener flange 733 to web 754 of the AWWB.

Backup structure 752 has left and right portions each including a vertical beam 763 coupled to an oblique strut 707. An aft end of the strut is coupled to a peripheral portion 758 of the fuselage.

FIG. 19 shows a fragmentary view of an aircraft 800 including a keel box 804 coupled to a rear section of the aircraft that includes a backup structure 852. Keel box 804 is identical to keel box 704 (see FIG. 17), but backup structure 852 is different from backup structure 752. More specifically, backup structure 852 has a vertical beam 863 equipped with a foot 817 that projects aft, as described above for backup structure 452 (see subsection C and FIG. 14).

E. Illustrative Method of Aircraft Manufacture

Figure 20:
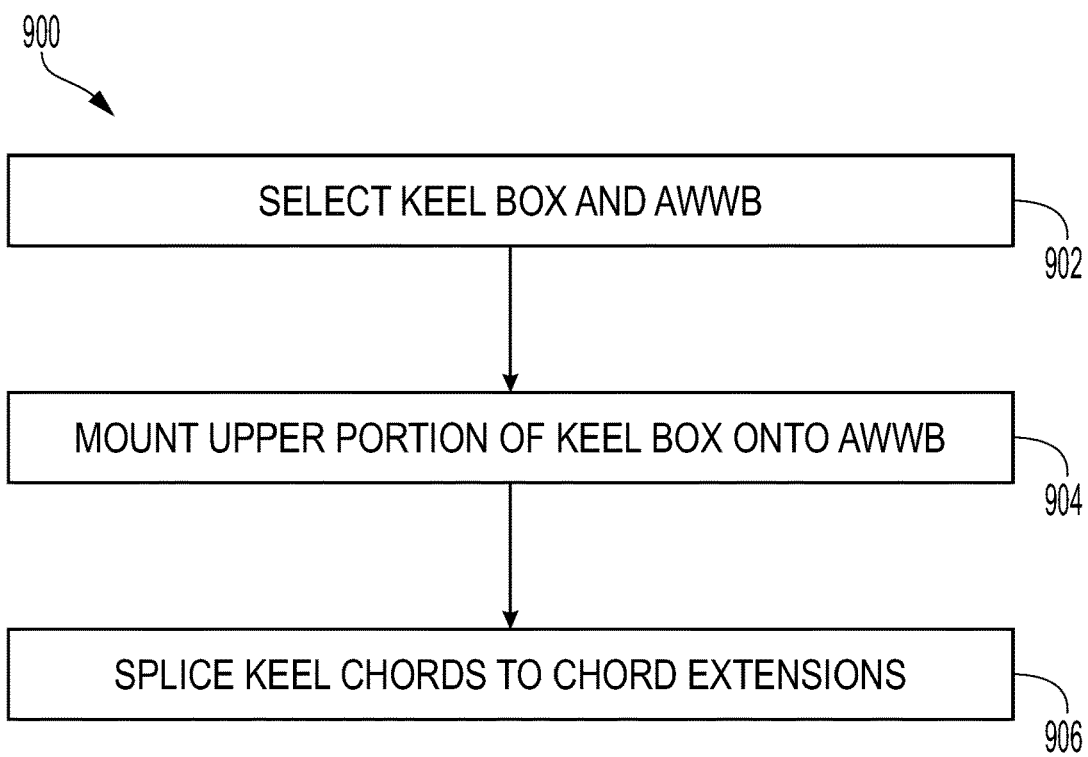
FIG. 20 is a flowchart depicting steps of an exemplary method of aircraft manufacture.

This subsection describes an illustrative method 900 of aircraft manufacture involving a keel beam assembly; see FIG. 20. The method steps described here may be performed in any suitable order, including simultaneously, in any suitable combination, including with one or more of the steps omitted, and may be performed using any keel assembly, keel box, AWWB, backup structure, and/or aircraft section(s) of the present disclosure.

At step 902, a keel box and an AWWB are selected. The keel box may be part of a keel beam assembly including a pair of keel chords forming at least part of a lower keel box portion of the keel box. The AWWB may be a single component or an assembly of coupled components including any combination of a web, one or more horizontal stiffeners mounted on a forward side (or on an aft side) of the web, a frame member extending along and secured to an edge of the web (optionally on an aft side of the web and/or along an arcuate edge of the web), and/or one or more vertical beams mounted on an aft side (or a forward side) of the web.

In some examples, an aircraft section including a fuselage portion may be selected. The fuselage portion, which may be described as a fuselage shell portion, may be coupled to the keel beam assembly, and the keel chords may extend outside an exterior surface of the fuselage portion and/or fuselage shell portion (i.e., outside an envelope defined an exterior surface of the skin of the fuselage portion). In some examples, the keel chords may form part of a keel box having an aft portion, and in the aft portion, the keel chords may be located at least predominantly outside the fuselage portion and/or fuselage shell portion (i.e., at least predominantly outside the envelope (greater than 50% outside the envelope by mass or volume)).

In some examples, first and second aircraft sections may be selected. When selected, the aircraft sections may have no mechanical connection to one another. The first aircraft section may be a midsection for an aircraft. The first aircraft section may include a first fuselage shell portion. The first fuselage shell portion may already be coupled to the pair of keel chords. Each of the keel chords may extend outside the first fuselage shell portion (i.e., outside an envelope defined by an exterior surface of a skin of the shell portion) and may be located at least predominantly outside the fuselage shell portion (i.e., at least predominantly outside the envelope), particularly in an aft portion of a keel box formed in part by the keel chords. The keel chords may form at least part of the lower portion of the keel box and may be coupled already to the upper portion of the keel box when the aircraft sections are selected. The second aircraft section may include a second fuselage shell portion, which may or may not already coupled to an aft wheel well bulkhead (AWWB) and/or to at least one or a pair of aft chord extensions, when the second aircraft section is selected.

At step 904, the upper keel box portion is mounted onto the AWWB, on a forward side of the AWWB. Mounting may include positioning the entire upper keel box portion forward of a web of the AWWB, and/or such that the upper keel box portion does not extend through the web of the AWWB. More specifically, mounting may be performed by extending fasteners through the AWWB, such as through a web, a peripheral frame member, a horizontal stiffener, and/or a vertical beam thereof. Mounting may create an initial mechanical connection between the aircraft sections or may be performed after the aircraft sections have already been connected to one another mechanically.

At step 906, the keel chords are spliced to aft chord extensions. More specifically, an aft end of at least one keel chord may be joined to a forward end of at least one aft chord extension. Splicing may be performed with a splicing device, such as a splice plate, secured with fasteners to one of the keel chords and to an aft chord extension.

F. Illustrative Aircraft and Associated Method

Figure 21:
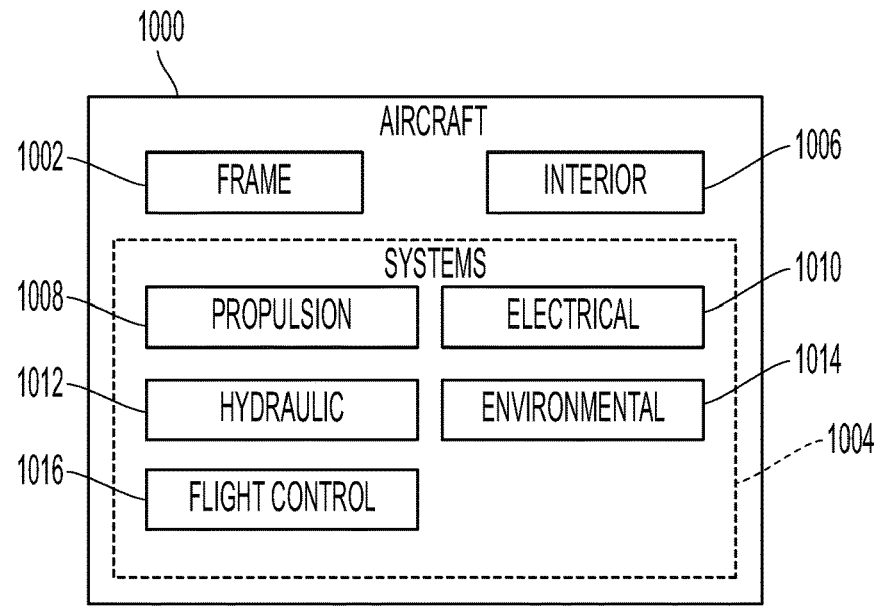
FIG. 21 is a schematic diagram of an illustrative aircraft.
Figure 22:
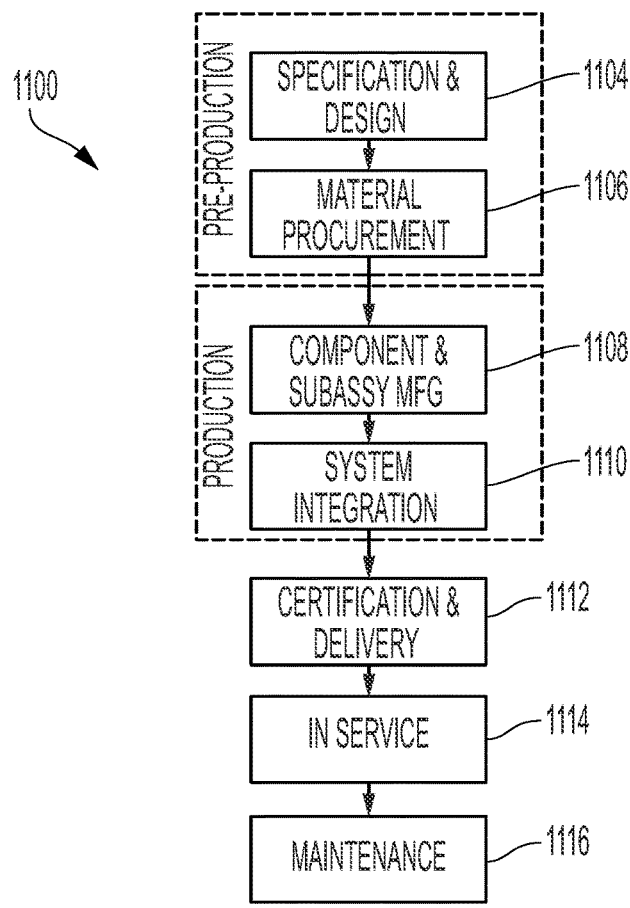
FIG. 22 is a flowchart depicting steps of an illustrative aircraft manufacturing and service method.

Examples disclosed herein may be described in the context of an illustrative aircraft 1000 (see FIG. 21) and an illustrative aircraft manufacturing and service method 1100 (see FIG. 22). Method 1100 includes a plurality of processes, stages, or phases. During pre-production, method 1100 may include a specification and design phase 1104 of aircraft 1000 and a material procurement phase 1106. During production, a component and subassembly manufacturing phase 1108 and a system integration phase 1110 of aircraft 1000 may take place. Thereafter, aircraft 1000 may go through a certification and delivery phase 1112 to be placed into in-service phase 1114. While in service (e.g., by an operator), aircraft 1000 may be scheduled for routine maintenance and service phase 1116 (which may also include modification, reconfiguration, refurbishment, and so on of one or more systems of aircraft 1000). While the examples described herein relate generally to the production and operational use of aircraft 1000, they may be practiced at other stages of method 1100.

Each of the processes of method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, aircraft 1000 produced by illustrative method 1100 may include a frame 1002 with a plurality of systems 1004 and an interior 1006. Examples of plurality of systems 1004 include one or more of a propulsion system 1008, an electrical system 1010, a hydraulic system 1012, an environmental system 1014, and a flight control system 1016. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 1000, the principles disclosed herein may apply to other vehicles, e.g., land vehicles, marine vehicles, etc.

Apparatuses and methods shown or described herein may be employed during any one or more of the stages of the aircraft manufacturing and service method 1100. For example, components or subassemblies corresponding to component and subassembly manufacturing phase 1108 may be fabricated or manufactured in a manner similar to components or subassemblies produced while aircraft 1000 is operating during in-service phase 1114. Also, one or more examples of the apparatuses, methods, or combinations thereof may be utilized during manufacturing phase 1108 and system integration phase 1110, for example, by substantially expediting assembly of or reducing the cost of aircraft 1000. Similarly, one or more examples of the apparatus or method realizations, or a combination thereof, may be utilized, for example and without limitation, while aircraft 1000 is in in-service phase 1114 and/or during maintenance and service phase 1116.

Illustrative Combinations and Additional Examples

This section describes additional aspects and features of the keel beam assemblies, keel boxes, chord extensions, AWWBs, backup structures, aircraft sections, aircraft, and associated methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A keel beam assembly, comprising: (i) a pair of keel chords extending outside an aircraft fuselage (e.g., outside a shell/skin of the aircraft fuselage) and forming at least part of a lower keel box portion of a keel box; and (ii) an upper keel box portion of the keel box coupled to the pair of keel chords and having an aft end engaged with and secured to an aft wheel well bulkhead (AWWB).

A2. The keel beam assembly of paragraph A1, wherein an aft portion of the keel box has a center of mass located close to an envelope defined by an exterior surface of a skin of the aircraft fuselage.

A2a. The keel beam assembly of paragraph A2, wherein the center of mass is located less than 10 centimeters from the envelope.

A2b. The keel beam assembly of paragraph A2, wherein the center of mass is located less than 4, 3, or 2 centimeters from the envelope.

A3. The keel beam assembly of any of paragraphs A1 to A2b, wherein the upper keel box portion is bolted to the AWWB.

A4. The keel beam assembly of any of paragraphs A1 to A3, wherein the AWWB includes a web, wherein the upper keel box portion is secured to a backup structure through the web, and wherein the backup structure is engaged with an aft side of the web and secured to a peripheral portion of the aircraft fuselage.

A5. The keel beam assembly of paragraph A4, wherein the keel box includes a body and one or more brackets fastened to the body, and wherein each bracket has one or more flanges engaged with the web of the AWWB and defining apertures through which the bracket is secured to the backup structure through the web using fasteners.

A6. The keel beam assembly of any of paragraphs A1 to A5, further comprising a pair of aft chord extensions spliced to the pair of keel chords at aft ends of the keel chords and extending outside the aircraft fuselage.

A7. The keel beam assembly of any of paragraphs A1 to A6, wherein the AWWB includes a web and a horizontal stiffener located on a forward side of the web, and wherein the upper keel box portion is engaged with and fastened to the horizontal stiffener.

A8. The keel beam assembly of any of paragraphs A1 to A7, further comprising a clip having a first portion mounted to the keel box at one of the keel chords and a second portion engaged with and secured to a forward side of the AWWB.

A9. The keel beam assembly of any of paragraphs A1 to A8, wherein the keel box is hollow.

A10. The keel beam assembly of any of paragraphs A1 to A9, wherein the keel box has an upper web, a lower web, and a pair of side webs (e.g., left- and right-side webs) spaced laterally from one another.

A11. The keel beam assembly of any of paragraphs A1 to A10, wherein the pair of keel chords is a pair of lower keel chords, wherein the keel box includes a pair of upper keel chords, an upper web extending between the upper keel chords and a lower web extending between the lower keel chords, and a pair of side webs (e.g., left- and right-side webs) laterally spaced from one another and each extending between an upper keel chord and a lower keel chord.

A12. The keel beam assembly of any of paragraphs A1 to A11, wherein the pair of keel chords are a left lower keel chord and a right lower keel chord, wherein the upper keel box portion includes a left upper keel chord and a right upper keel chord.

A12a. The keel beam assembly of paragraph A12, wherein the lower keel chords are primary/major keel chords and the upper keel chords are minor/secondary keel chords, wherein the left lower keel chord and the left upper keel chords are aligned with one another in a left plane (optionally a vertical left plane), and wherein the right lower keel chord and the right upper keel chord are aligned with one another in a right plane (optionally a vertical right plane).

A13. The keel beam assembly of paragraph A12 or A12a, wherein the upper keel box portion includes a left bracket and a right bracket each engaged with the AWWB, wherein the left bracket is aligned with the left lower keel chord and the left upper keel chord in the left plane, and wherein the right bracket is aligned with the right lower keel chord and the right upper keel chord in the right plane.

A14. The keel beam assembly of paragraph A12, A12a, or A13, wherein the AWWB includes a web, and wherein the upper keel box portion is coupled through the web to a left vertical beam and a right vertical beam located aft of the web, wherein the left vertical beam is aligned with the left lower keel chord and the left upper keel chord in the left plane, and wherein the right vertical beam is aligned with the right lower keel chord and the right upper keel chord in the right plane.

A15. The keel beam assembly of any of paragraphs A1 to A14, wherein an aft portion of the keel chords of the pair of keel chords extends along an aft portion of the keel box and is located at least predominantly outside the aircraft fuselage.

A15a. The keel beam assembly of paragraph A15, wherein at least 50%, 60%, 70%, or 80% of the mass of the aft portion of the keel chords is located outside an envelope defined by an exterior surface of a skin/shell of the aircraft fuselage.

A16. The keel beam assembly of any of paragraphs A1 to A15a, wherein the keel beam assembly is mounted to a backup structure that is rearwardly adjacent a web of the AWWB.

A17. The keel beam assembly of paragraph A16, wherein the backup structure includes a strut having a longitudinal axis arranged obliquely to a longitudinal axis of the aircraft fuselage.

A18. The keel beam assembly of paragraph A17, wherein the strut has a forward end coupled to a vertical beam of the backup structure and an aft end coupled to a structural framework of the aircraft fuselage located inwardly adjacent a skin of the aircraft fuselage.

A19. The keel beam assembly of any of paragraphs A16 to A18, wherein the backup structure includes a vertical beam mounted onto an aft side of the web of the AWWB.

A20. The keel beam assembly of paragraph A19, wherein the vertical beam extends to a deck located over the backup structure.

A21. The keel beam assembly of paragraph A20, wherein the vertical beam includes a body defining a longitudinal axis, optionally oriented parallel to a plane defined by the AWBB, and also includes a foot projecting rearwardly from the body and secured to a structural framework located inwardly adjacent a skin of the aircraft fuselage.

A22. The keel beam assembly of paragraph A21, wherein the body and the foot are formed integrally with one another.

A23. The keel beam assembly of paragraph A21, wherein the body and the foot are formed separately from one another.

A24. The keel beam assembly of any of paragraphs A16 to A23, wherein the backup structure includes a horizontal beam elongated parallel to a longitudinal axis of the aircraft, and wherein the horizontal beam is located on and/or secured to a structural framework and/or a skin of the aircraft fuselage.

A25. The keel beam assembly of any of paragraphs A16 to A24, wherein the backup structure spans at least one or two frame bays of the aircraft fuselage.

A26. The keel beam assembly of any of paragraphs A16 to A24, wherein the backup structure spans less than one frame bay of the aircraft fuselage.

A27. The keel beam assembly of any of paragraphs A1 to A26, wherein the AWWB includes a web having a peripheral edge and a frame member extending along the peripheral edge and secured to web and the aircraft fuselage, and wherein the upper portion of the keel box is mounted onto a forward side of the web using fasteners that extend through the web and the frame member.

B1. An aircraft, comprising: (i) a fuselage; (ii) an aft wheel well bulkhead (AWWB); and (iii) a keel beam assembly including a pair of keel chords extending outside the fuselage and forming at least part of a lower keel box portion of a keel box, the keel beam assembly also including an upper keel box portion of the keel box coupled to the pair of keel chords and having an aft end mounted onto a forward side of the AWWB.

B2. The aircraft of paragraph B1, further comprising a pair of aft chord extensions spliced to the pair of keel chords at aft ends of the keel chords and extending outside the fuselage.

B3. The aircraft of paragraph B2, wherein an aft portion of the keel box has a center of mass located close to an envelope defined by an exterior surface of a skin of the fuselage.

B3a. The aircraft of paragraph B3, wherein the center of mass is located less than 10 centimeters from the envelope.

B3b. The aircraft of paragraph B3, wherein the center of mass is located less than 4, 3, or 2 centimeters from the envelope.

B4. The aircraft of any of paragraphs B1 to B3b, wherein the AWWB includes a web, and wherein the upper keel box portion is mounted onto a forward side of the web, further comprising a backup structure engaged with an aft side of the web and fastened to the upper keel box portion through the web.

B5. The aircraft of paragraph B4, wherein the upper keel box portion has a pair of side portions (e.g., left- and right-side portions) spaced laterally from one another, and wherein each side portion is separately bolted through the web to a backup structure engaged with an aft side of the web and secured to a peripheral portion of the fuselage.

B6. The aircraft of paragraph B5, wherein each side portion is bolted through the web to a respective vertical beam of the backup structure.

B7. The aircraft of any of paragraphs B1 to B6, wherein the keel box includes a body and one or more brackets fastened to the body, and wherein each bracket has one or more flanges engaged with the AWWB and defining apertures through which the bracket is mounted onto the AWWB.

B8. The aircraft of any of paragraphs B1 to B7, further comprising any limitation(s) of any of paragraphs A1 to A27 of this section.

C1. A method of aircraft manufacture using an aircraft section including a fuselage portion coupled to a pair of keel chords, wherein the keel chords extend outside the fuselage portion, form at least part of a lower keel box portion of a keel box, and are coupled to an upper keel box portion of the keel box, the method comprising: mounting an aft end of the upper keel box portion onto a forward side of an aft wheel well bulkhead (AWWB).

C2. The method of paragraph C1, wherein the AWWB includes a web, and wherein mounting includes extending a plurality of fasteners through the web of the AWWB.

C3. The method of paragraph C2, wherein mounting includes bolting the upper keel box portion through the web of the AWWB to a vertical beam located on an aft side of the web.

C4. The method of any of paragraphs C1 to C3, wherein the aircraft section is a first aircraft section, the method further comprising coupling the AWWB to a fuselage portion of a second aircraft section prior to mounting.

C5. The method of any of paragraphs C1 to C4, wherein the AWWB includes a web, and wherein mounting comprises positioning the keel box such that no part of the keel box extends through the web.

C6. The method of any of paragraphs C1 to C5, further comprising any limitation(s) of any of paragraphs A1 to A27 or B1 to B7 of this section.

Advantages, Features, and Benefits

The different examples of a keel box, a keel beam assembly, an AWWB, a backup structure, aircraft sections, and corresponding aircraft and associated manufacturing methods described herein, provide several advantages over known solutions. For example, illustrative examples described herein of a keel box and AWWB provide any combination of improved load transfer, separate fabrication and construction, simplified joining, lighter weight, lower cost, fewer parts, and faster more economical aircraft production.

Additionally, and among other benefits, illustrative examples described herein of a keel box place primary chords of the keel box outside the fuselage shell/skin of an aircraft or aircraft section, and an upper portion of the keel box inside the fuselage shell/skin. This configuration advantageously positions the center of gravity of an aft portion of the keel box close to the shell/skin exterior surface (e.g., less than 10, 4, 3, or 2 centimeters from an envelope defined by the exterior surface of the skin/shell). As a result, the overall induced moment for a large load transfer is minimized, which provides better aerodynamic control and less stress on the aircraft. Moreover, this configuration optimally lines up the keel box with the fuselage skin at the aft end of the keel box, where the loads are highest.

Additionally, and among other benefits, illustrative examples herein of a keel box fully splice an upper portion of the keel box at the AWWB, without any pass-through or continuous members of the keel box extending through and/or interrupting the web of the AWWB. This configuration enables faster, more efficient aircraft production, as it allows the keel box and AWWB to be fabricated and sub-assembled independently, and then joined to one another at a later stage of aircraft manufacture using fasteners such as bolts, with a relatively small amount of time and effort.

Additionally, and among other benefits, illustrative examples described herein simplify the fabrication and construction of the AWWB for an aircraft.

Additionally, and among other benefits, illustrative examples described herein of a keel box save weight by having the centroid of the keel box align closely with the fuselage skin. This configuration provides a structurally efficient load path that reduces overall eccentricity-induced bending, which allows for a lighter-weight design of the keel box.

Additionally, and among other benefits, illustrative examples described herein simplify the fabrication and assembly of the AWWB, by reducing the usage of titanium and the time needed to drill/slot the titanium. This reduced usage and machining of titanium reduces cost and weight.

Additionally, and among other benefits, illustrative examples described herein enable production of midsize aircraft. By fully splicing a keel box at the AWWB, this approach allows the keel box, the AWWB, and an aft fuselage body to be independently fabricated and then assembled without requiring complicated slotting or threading of parts of the keel box through the web of the AWWB. This approach allows for faster and simpler end item joining.

Additionally, and among other benefits, illustrative examples described herein use one or more parts of the AWWB for splicing to the keel box, which reduces the number of parts needed for assembly.

The disclosed keel box, keel beam assembly, AWWB, aircraft, and aircraft production system can provide these example benefits over known keel boxes, keel beam assemblies, AWWB, aircraft, and aircraft production systems. However, not all examples described herein provide the same advantages or the same degree of advantage.

CONCLUSION

The disclosure set forth above may encompass multiple distinct examples with independent utility. Although each of these has been disclosed in one or more illustrative forms, the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A keel beam assembly, comprising:
a pair of keel chords extending outside an aircraft fuselage and forming at least part of a lower keel box portion of a keel box; and
an upper keel box portion of the keel box coupled to the pair of keel chords and having an aft end engaged with and secured to an aft wheel well bulkhead (AWWB), wherein the AWWB includes a web, the upper keel box portion having a pair of side portions spaced laterally from one another, and an upper portion connecting the pair of side portions, wherein the pair of side portions are separately secured through the web to a backup structure engaged with an aft side of the web.

2. The keel beam assembly of claim 1, wherein an aft portion of the keel box has a center of mass located within 10 centimeters of an envelope defined by an exterior surface of a skin of the aircraft fuselage.

3. The keel beam assembly of claim 1, wherein the upper keel box portion is bolted to the AWWB.

4. The keel beam assembly of claim 1, secured to a peripheral portion of the aircraft fuselage.

5. The keel beam assembly of claim 4, wherein the keel box includes a body and one or more brackets fastened to the body, and wherein each bracket has one or more flanges engaged with the web of the AWWB and defining apertures through which the bracket is secured to the backup structure through the web using fasteners.

6. The keel beam assembly of claim 1, further comprising a pair of aft chord extensions spliced to the pair of keel chords at aft ends of the keel chords and extending outside the aircraft fuselage.

7. The keel beam assembly of claim 1, wherein the AWWB includes a web and a horizontal stiffener located on a forward side of the web, and wherein the upper keel box portion is engaged with and fastened to the horizontal stiffener.

8. The keel beam assembly of claim 1, further comprising a clip having a first portion mounted to the keel box at one of the keel chords and a second portion engaged with and secured to a forward side of the AWWB.

9. The keel beam assembly of claim 1, wherein the upper keel box portion is welded to the AWWB.

10. An aircraft, comprising:
a fuselage;
an aft wheel well bulkhead (AWWB) including a web;
a keel beam assembly including a pair of keel chords extending outside the fuselage and forming at least part of a lower keel box portion of a keel box, the keel beam assembly also including an upper keel box portion of the keel box coupled to the pair of keel chords and having an aft end mounted onto a forward side of the web of the AWWB; and
a backup structure engaged with an aft side of the web and secured to a peripheral portion of the fuselage, wherein;
the upper keel box portion has a pair of side portions spaced laterally from one another; and
each side portion is separately bolted through the web to the backup structure.

11. The aircraft of claim 10, further comprising a pair of aft chord extensions spliced to the pair of keel chords at aft ends of the keel chords and extending outside the fuselage.

12. The aircraft of claim 10, wherein an aft portion of the keel box has a center of mass located within 10 centimeters of an envelope defined by an exterior surface of a skin of the fuselage.

13. The aircraft of claim 10, wherein each side portion is bolted through the web to a respective vertical beam of the backup structure.

14. The aircraft of claim 10, wherein the keel box includes a body and one or more brackets fastened to the body, and wherein each bracket has one or more flanges engaged with the AWWB and defining apertures through which the bracket is mounted onto the AWWB.

15. The aircraft of claim 10, wherein the backup structure includes a vertical beam.

16. The aircraft of claim 10, wherein the aft end of the upper keel box portion is bolted to the backup structure, the backup structure being secured against the aft side of the web.

17. The aircraft of claim 10, wherein the backup structure is comprised of a left vertical beam and a right vertical beam.

18. A method of aircraft manufacture using an aircraft section including a fuselage portion coupled to a pair of keel chords, wherein the keel chords extend outside the fuselage portion, form at least part of a lower keel box portion of a keel box, and are coupled to an upper keel box portion of the keel box, the method comprising:
mounting an aft end of the upper keel box portion onto a forward side of an aft wheel well bulkhead (AWWB), wherein the AWWB includes a web, and wherein mounting includes bolting the upper keel box portion through the web of the AWWB to a vertical beam located on an aft side of the web.

19. The method of claim 18, wherein the aircraft section is a first aircraft section, the method further comprising coupling the AWWB to a fuselage portion of a second aircraft section prior to mounting.

20. The method of claim 18, wherein mounting comprises positioning the keel box such that no part of the keel box extends through the web.

* * * * *